US012581561B2

(12) United States Patent
Jangid et al.

(10) Patent No.: US 12,581,561 B2
(45) Date of Patent: Mar. 17, 2026

(54) METHOD AND DEVICE FOR CONTINUITY OF MODEM SERVICE

(71) Applicant: Samsung Electronics Co., Ltd., Gyeonggi-do (KR)

(72) Inventors: Alok Kumar Jangid, Bangalore (IN); Lalith Kumar, Bangalore (IN); Kailash Kumar Jha, Bangalore (IN); Ravi Pandappa Kamaladinni, Bangalore (IN); Varini Gupta, Bangalore (IN)

(73) Assignee: Samsung Electronics Co., Ltd (KR)

( * ) Notice: Subject to any disclaimer, the term of this patent is extended or adjusted under 35 U.S.C. 154(b) by 393 days.

(21) Appl. No.: 18/547,228

(22) PCT Filed: Feb. 18, 2022

(86) PCT No.: PCT/KR2022/002435
§ 371 (c)(1),
(2) Date: Aug. 21, 2023

(87) PCT Pub. No.: WO2022/177354
PCT Pub. Date: Aug. 25, 2022

(65) Prior Publication Data
US 2024/0147567 A1 May 2, 2024

(30) Foreign Application Priority Data

Feb. 20, 2021 (IN) .............................. 202141007205
Feb. 20, 2021 (IN) .............................. 202141007206
(Continued)

(51) Int. Cl.
*H04W 76/25* (2018.01)
*H04W 76/22* (2018.01)

(52) U.S. Cl.
CPC ........... *H04W 76/25* (2018.02); *H04W 76/22* (2018.02)

(58) Field of Classification Search
None
See application file for complete search history.

(56) References Cited

U.S. PATENT DOCUMENTS 7,173,925 B1    2/2007  Dantu et al.
7,215,955 B2 *  5/2007  Forssell ................ H04W 24/02
                                                           455/433
(Continued)

FOREIGN PATENT DOCUMENTS

KR      10-2020-0139771        12/2020
WO      WO 2020/099943          5/2020

OTHER PUBLICATIONS

PCT/ISA/210 Search Report dated May 24, 2022 issued on PCT/KR2022/002435, pp. 3.
(Continued)

*Primary Examiner* — Lonnie V Sweet
(74) *Attorney, Agent, or Firm* — The Farrell Law Firm, P.C.

(57) ABSTRACT

The disclosure relates to a 5G or 6G communication system for supporting a higher data transmission rate. Embodiments herein provide a method for continuity of modem service by a user equipment (UE). The method includes detecting modem restart at the UE (100). The method includes determining whether a wireless network (400) and the UE (100) supports a session and mobility management feature upon detecting the restart of the modem (150), and identifying SM-MM contexts used by the UE (100) for accessing the modem service upon determining that the wireless network entity (200) supports the session and the mobility management feature. The method includes transmitting a first signaling message comprising at least one of the SM context
(Continued)

and the MM context to the wireless network entity (200) for the continuity of the modem service.

20 Claims, 18 Drawing Sheets

(30)          Foreign Application Priority Data

Feb. 23, 2021    (IN) .............................. 202141007465
Feb. 11, 2022    (IN) .............................. 202141007205

(56)                References Cited

U.S. PATENT DOCUMENTS

| | | | |
|---|---|---|---|
| 10,917,933 B2 * | 2/2021 | Kim | H04W 52/0241 |
| 2004/0087315 A1 * | 5/2004 | Dufva | H04W 4/029 |
| | | | 455/433 |
| 2014/0302874 A1 * | 10/2014 | Zakrzewski | H04W 4/70 |
| | | | 455/456.1 |
| 2019/0273650 A1 * | 9/2019 | Ma | H04L 41/5058 |
| 2020/0367240 A1 | 11/2020 | Sung et al. | |
| 2020/0383159 A1 | 12/2020 | Babu et al. | |
| 2021/0127255 A1 * | 4/2021 | Li | H04W 76/15 |
| 2021/0168584 A1 | 6/2021 | Li et al. | |
| 2021/0204103 A1 * | 7/2021 | Bartolomé Rodrigo | |
| | | | H04W 4/50 |
| 2022/0053449 A1 * | 2/2022 | Shan | H04W 36/0066 |
| 2022/0095260 A1 * | 3/2022 | Shan | H04W 60/04 |
| 2022/0394652 A1 * | 12/2022 | Thakolsri | H04W 60/00 |
| 2023/0328588 A1 * | 10/2023 | Mildh | H04W 28/06 |
| | | | 370/328 |
| 2024/0381283 A1 * | 11/2024 | Sethi | H04W 60/04 |

OTHER PUBLICATIONS

PCT/ISA/237 Written Opinion dated May 24, 2022 issued on PCT/KR2022/002435, pp. 5.
Indian Examination Report dated Aug. 30, 2022 issued on Indian Application No. 202141007205, pp. 5.
3GPP TS 23.501 V16.7.0 (Dec. 17, 2020), pp. 452.
Nokia, Nokia Shanghai Bell (Rapporteur), "Mega CR to clean up", Online, Nov. 16-20, 2020 (revision of S2-200xxxx), pp. 429.

* cited by examiner

METHOD AND DEVICE FOR CONTINUITY OF MODEM SERVICE

CROSS-REFERENCE TO RELATED APPLICATIONS

This application is a U.S. National Phase Entry of PCT International Application No. PCT/KR2022/002435, which was filed on Feb. 18, 2022, and claims priority to Indian patents application Nos. 202141007205, 202141007206, 202141007465, and 202141007205, which were filed on Feb. 20, 2021, Feb. 20, 2021, Feb. 23, 2021, and Feb. 11, 2022, respectively, the entire disclosure of each of which is incorporated herein by reference.

TECHNICAL FIELD

The present disclosure relates to wireless communication, and more specifically to methods and devices for continuity of the modem service.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultrahigh-performance communication and computing resources.

Referring to FIG. 1A, a 5$^{th}$ generation (5G) cellular network (herein called as wireless network (40)) supports architectural principle in which every network function can evolve separately and network functions of the wireless network (40) should have minimal impact on each other. The wireless network (40) supports control plane and user plane separation. However, a control plane of the wireless network (40) is tightly coupled and handles both session management (SM) context and mobility management (MM) signaling messages. FIG. 1A illustrates the wireless network (40). As shown in 10 of the FIG. 1A, upon establishing an application (App) session at a user equipment (UE) (50), an Access and mobility management Function (AMF) (11) of the wireless network (40) stores MM context and starts protocol data unit (PDU) sessions.

The AMF (11) maintains identifier (ID) of each PDU session (e.g. PDU session 1, PDU session 2), a session type and radio access technology (RAT) information for each PDU. Based on the MM context, the AMF (11) controls the PDU sessions. SM context for each PDU session is started and stored at session management function (SMF) (12A, 12B) of the wireless network (40). Thus, the MM context and the SM context are tightly coupled in the wireless network. As shown in 13 and 14 of the FIG. 1A, the AMF (11) and the SMF (12) are also coupled in the control plane, and a base station (gNB (15)) and a User Plane Function (UPF) (16) of the wireless network (40) are coupled in the user plane. Therefore, a control plane signaling and a change in the MM context is having impact on the SM context. For example, when the MM context is deleted, then the PDU sessions are also deactivated, SM contexts is also deleted and service continuity is lost.

FIG. 1B is a flow diagram illustrating a method of creation and deletion of the MM context and the SM context at the wireless network (40). As shown in 20 of the FIG. 1B, the UE (50) is connected to the wireless network (40), and initiates an application session. At 21-22, the UE (50) requests to the AMF (11) for MM context registration. At 22, the AMF (11) creates the MM context for registering the MM context for the UE (50). At 23, the UE (50) requests to the SMF (11) for SM context registration.

At 24, the AMF (11) creates the SM context for registering the SM context for the UE (50). At 25-26, the UE (50) generates application sockets and the UPF (16) creates the app socket context for establishing the applications session.

As shown in 30 of the FIG. 1B, consider a modem of the UE (50) is restarted. The modem restarts due to events such as security patch updates, operating system updates, modem feature updates, application update for fixing bugs, power down due to low battery, silent reset of MM context due to application bugs, subscriber identification module (SIM) refresh, modem setting changes via open mobile alliance device management (OMADM), network initiated detach request with "Re-Attach Required", data stall recovery upon throttling timer expiry, OOS case due to implicit detach timer expiry, etc. Upon restarting the modem, the UE (50) requests to the wireless network (40) for detach/de-registration followed by re-attach/re-registration.

At 31-32, the UE (50) resets the app sockets and transmits request to the wireless network (40) to detach. Also, the UE (50) performs de-registration locally by deleting the SM context. The UE (50) deactivates internet PDN and all active PDU sessions. The UE (50) releases App connections (i.e. socket), and the MM & SM contexts. At 33-35, the AMF (11) deletes the MM context, the SMF (12) deletes the SM context, and the UPF (16) deletes the App socket context, upon receiving the detach request. The wireless network (40) releases the UE's MM context, the UE's SM context, network tunnels, and the socket connections to App servers. Further, the UE (50) performs registration procedure again with an initial type. In one scenario, when modem reset occurs, then the UE's SM context is deleted at the UE (50) and the wireless network (40) due to de-registration/detach procedure initiated by the UE (50). Hence, it is desired to provide a solution to recover the SM context at UE (50) and the wireless network (40) for service continuity. Also, it is desired to define handling of a UE's MM state machine.

In another scenario, when modem silent reset occurs, then the UE's SM context is deleted at the UE (50) locally.

Hence, it is desired to provide a solution for preventing the UE (50) from deleting the SM context locally. Also, it is desired to provide a solution for indicating the wireless network (40) for assigning the same SM context used by the UE (50) during the app session, handling of the UE's MM state machine, indicating MM-SM feature support of the wireless network (40) to the UE (50) for backward compatibility, and negotiating between the UE (50) and the wireless network (40) for the MM-SM feature support. Also, it is desired to provide a solution for configuring a time duration to maintaining the SM context at the wireless network (40) and the UE (50), and parsing the stored SM context.

FIG. 1C illustrates an application layer (52) and a lower layer (53) of the UE (50). The UE (50) is having multiple applications, running on an application processor. The application has their context, an internet protocol (IP) address and security parameters stored in the application processor. When the lower layer (53) is restarted due to the modem reboot/restart, then the application context also resets depending upon the device capability due to which the application service continuity is lost. Due to device capability, different scenarios are possible at the lower layer (3) as follows. In one scenario, the modem is restarted, but the UE (50) is able to store the MM context but SM context is not stored. It is desired to provide a solution for UE (50) to recover the SM context after the modem reboot.

In another scenario, the modem is restarted, the UE (50) is not able to store the MM context, but the SM context is stored. It is desired to provide a solution for UE (50) to synchronise the SM context with the wireless network (40) after the modem reboot. In another scenario, the modem is restarted, the UE (50) is not able to store the MM context, and the SM context. It is desired to provide a solution for UE (50) to create new MM context and retrieve the SM context after the modem reboot. In another scenario, the modem is restarted, the UE (50) is able to store the MM context, and the SM context. It is desired to provide a solution for UE (50) to synchronise with the wireless network (40) after the modem reboot and retain the SM and MM contexts.

DISCLOSURE OF INVENTION

Solution to Problem

The principal object of the embodiments herein is to provide a method and devices for continuity of the modem service. The proposed method optimizes signaling and resource between 5G network nodes, and between 5G core and external/3rd party nodes. For example re-execution of procedures such as network slice specific authentication, authentication and key management for applications (AKMA) related procedures that needs FFS, edge related procedures, and other SA6 defined application-level procedures can be avoided by using the proposed method. Also, a service activation time is drastically reduced for retaining an IP address of the UE using the proposed method, which is more critical for time sensitive applications etc. The proposed method provides application agnostic recovery i.e. a reset at the wireless network has zero impacts to application layer.

Another object of the embodiments herein is to recover the SM context at UE and the wireless network for service continuity.

Another object of the embodiments herein is to define handling of a UE's MM state machine.

Another object of the embodiments herein is to prevent the UE from deleting the SM context locally.

Another object of the embodiments herein is to indicate the wireless network for reassigning the SM context used by the UE for the service continuity.

Another object of the embodiments herein is to indicate a MM-SM feature support of the wireless network to the UE for backward compatibility.

Another object of the embodiments herein is to negotiate between the UE and the wireless network for the MM-SM feature support.

Another object of the embodiments herein is to configure a time duration to store the SM context at the wireless network and the UE.

Another object of the embodiments herein is to provide a protocol for parsing the stored SM context.

Another object of the embodiments herein is to recover the SM context at the UE after the modem reboot.

Another object of the embodiments herein is to synchronise the SM context with the wireless network after the modem reboot.

Another object of the embodiments herein is to create new MM context and retrieve the SM context after the modem reboot.

Another object of the embodiments herein is to synchronise with the wireless network after the modem reboot and retain the SM and MM contexts.

Accordingly, the embodiments herein provide a method for continuity of a modem service. The method includes detecting, by a user equipment (UE), a restart of a modem of the UE while accessing a wireless network using the modem service. The method includes determining, by the UE, whether a wireless network entity supports a session and mobility management feature. The method includes identifying, by the UE, session management (SM) context and mobility management (MM) context used by the UE for accessing the modem service upon determining that the wireless network entity supports the session and mobility management feature. The method includes transmitting, by the UE, a first signaling message comprising at least one of the SM context and the MM context to the wireless network entity for continuity of the modem service based on availability of the SM context and the MM context at the UE.

In an embodiment, where determining, by the UE, whether the wireless network entity supports the session and mobility management feature, comprises receiving, by the UE, a third signaling message comprising information of availability of the session and mobility management feature at the wireless network entity, a list of public land mobile networks (PLMNs) comprising the SM context, and a protocol data unit (PDU) or a data network (DNN) corresponds to the session and mobility management feature from the wireless network entity, and determining, by the UE, whether the wireless network entity supports the session and mobility management feature based on the third signaling message.

In an embodiment, where transmitting, by the UE, the first signaling message comprising at least one of the SM context and the MM context to the wireless network entity for the continuity of the modem service based on availability of the SM context and the MM context at the UE, comprises determining, by the UE, whether at least one of the SM context and the MM context is available at a first storage area, initiating, by the UE, a timer, transmitting, by the UE, the first signaling message comprising a timer value and at least one of the SM context and the MM context to the wireless network entity based on availability of the SM context and the MM context at the first storage area, and performing, by the UE, one of: receiving a second signaling message comprising at least one of the SM context and the MM context from the wireless network entity before expiry of the timer, terminating the timer, and continue accessing the wireless network using the modem service based on the second signaling message, and not receiving the second signaling message comprising at least one of the SM context and the MM context from the wireless network entity before expiry of the timer, terminating the timer, and transmitting another signaling message for new SM and MM contexts.

In an embodiment, where the method includes deleting, by the UE, at least one the SM context and the MM context from the first storage area in response to the expiry or termination of the timer, when the at least one of the SM context and the MM context is available at the first storage area.

In an embodiment, where transmitting, by the UE, the first signaling message comprising the timer value and at least one of the SM context and the MM context to the wireless network entity, comprises parsing, by the UE, at least one of the stored SM context and the stored MM context using a new protocol upon determining that at least one of the SM context and the MM context is stored at the UE, and transmitting, by the UE, the first signaling message comprising the timer value and at least one of the SM context and the MM context to the wireless network entity.

In an embodiment, where receiving, by the UE, the second signaling message comprising the SM context from the wireless network entity, comprises receiving, by the UE, a fourth signaling message comprising availability of the SM context at the wireless network entity and a packet data network (PDN) list from the wireless network entity, transmitting, by the UE, a fifth signaling message comprising an existing PDU and a context recovery information element to the wireless network entity, and receiving, by the UE, the second signaling message comprising an internet protocol (IP) and other parameters used for accessing the wireless network from the wireless network entity.

In an embodiment, where receiving, by the UE, the second signaling message comprising the SM context from the wireless network entity, comprises receiving, by the UE, a fourth signaling message comprising availability of the SM context at the wireless network entity and a PDN list from the wireless network entity, and receiving, by the UE, the second signaling message comprising an access point name (APN), a PDU session identifier (ID), an IP and other parameters used for accessing the wireless network from the wireless network entity.

In an embodiment, where receiving, by the UE, the second signaling message comprising the SM context from the wireless network entity, comprises receiving, by the UE, the fourth signaling message comprising availability of the SM context at the wireless network entity and the PDN list from the wireless network entity, and receiving, by the UE, the second signaling message comprising a PDU context shared over a default bearer from the wireless network entity.

In an embodiment, where identifying, by the UE, the SM context and the MM context used by the UE for accessing the modem, comprises determining, by the UE, the SM context, the MM context, and a connection socket context of an application used for accessing the wireless network using the modem service, decoupling, by the UE, the SM context and the MM context, and storing, by the UE, the connection socket context and at least one of the SM context and the MM context to a first storage area.

In an embodiment, where the method comprises moving, by the UE, from one of a 5GMM-DEREGISTERED state to 5GMM-REGISTERED.UPDATE-NEEDED state, and an EMM-DEREGISTERED state to EMM-REGIS-TERED.UPDATE-NEEDED state based on the stored MM context.

Accordingly, the embodiments herein provide a method for continuity of the modem service. The method includes receiving, by the wireless network entity, the first signaling message comprising at least one of session management (SM) context and mobility management (MM) context from the UE upon restarting the modem of the UE while accessing the wireless network using the modem service. The method includes determining, by the wireless network entity, a connection socket context of the application used for accessing the wireless network using the modem service. The method includes storing, by the wireless network entity, the connection socket context and at least one of the SM context and the MM context to a second storage area. The method includes determining, by the wireless network entity, whether the UE supports the session and mobility management feature. The method includes transmitting, by the wireless network entity, a second signaling message comprising at least one of the SM context and the MM context to the UE for continuity of the modem service upon determining that the UE supports the session and mobility management feature.

In an embodiment, where determining, by the wireless network entity, whether the UE supports the session and mobility management feature, comprises receiving, by the wireless network entity, a third signaling message comprising information of availability of the session and mobility management feature at the UE, and a protocol data unit (PDU) or a data network (DNN) corresponds to the session and mobility management feature from the UE, and determining, by the wireless network entity, whether the UE supports the session and mobility management feature based on the third signaling message.

In an embodiment, where transmitting, by a wireless network entity, the second signaling message to the UE, comprises determining, by the wireless network entity, the timer value from the first signaling message, initiating, by the wireless network entity, a timer based on the timer value, wherein the wireless network entity can modify the timer value and configure the modified timer value at the UE, parsing, by the wireless network entity, at least one of the stored SM context and the stored MM context using a new protocol, determining, by the wireless network entity, whether at least one of the stored SM context and the stored MM context is parsed before expiry of the timer, and performing, by the wireless network entity, one of: transmitting the second signaling message by including at least one of the SM context and the MM context before expiry of the timer upon determining that at least one of the stored SM context and the stored MM context is parsed before expiry of the timer, and terminating the timer, and transmitting the second signaling message without including at least one of the stored SM context and the stored MM context upon determining that at least one of the stored SM context and the stored MM context is not parsed before expiry of the timer, and terminating the timer.

In an embodiment, the method includes deleting, by the wireless network entity, at least one the SM context and the MM context from the second storage area in response to expiry or termination of the timer, when the at least one of the SM context and the MM context is available at the second storage area.

In an embodiment, where transmitting, by the wireless network entity, the second signaling message by including at least one of the SM context and the MM context receiving, comprises transmitting, by the wireless network entity, a fourth signaling message comprising availability of the SM context at the wireless network entity and a packet data network (PDN) list to the UE, receiving, by the wireless network entity, a fifth signaling message comprising the existing PDU and the context recovery information element from the UE, and transmitting, by the wireless network entity, the second signaling message comprising the internet protocol (IP) and other parameters used by the UE for accessing the wireless network to the UE.

In an embodiment, where receiving, by the UE, the second signaling message comprising the SM context from the wireless network entity, comprises transmitting, by the wireless network entity, the fourth signaling message comprising availability of the SM context at the wireless network entity and the PDN list to the UE, and transmitting, by the wireless network entity, the second signaling message comprising the access point name (APN), the PDU session identifier (ID), the IP and other parameters used for accessing the wireless network to the UE.

In an embodiment, where receiving, by the UE, the second signaling message comprising the SM context from the wireless network entity, comprises transmitting, by the wireless network entity, the fourth signaling message comprising availability of the SM context at the wireless network entity and the PDN list to the UE, and transmitting, by the wireless network entity, the second signaling message comprising the PDU context shared over the default bearer to the UE.

In an embodiment, where the second storage area is located at one of an Access and mobility management function (AMF), a session management function (SMF), and a central repository of the wireless network entity.

In an embodiment, where when the SM context is stored at the central repository, then the AMF fetches the SM context from the central repository for providing the SM context to the UE.

Accordingly, the embodiments herein provide the UE for continuity of the modem service. The UE includes a mobility session socket (MSS) context controller, a memory, a processor, and the modem, where the MSS context controller is coupled to the memory, the modem and the processor. The MSS context controller is configured for detecting the restart of the modem of the UE while accessing the wireless network using the modem service. The MSS context controller is configured for determining whether the wireless network entity supports the session and mobility management feature. The MSS context controller is configured for identifying session management (SM) context and mobility management (MM) context used by the UE for accessing the modem service upon determining that the wireless network entity supports the session and mobility management feature. The MSS context controller is configured for transmitting the first signaling message comprising at least one of the SM context and the MM context to the wireless network entity for continuity of the modem service based on availability of the SM context and the MM context at the UE.

Accordingly, the embodiments herein provide the wireless network entity for continuity of the modem service. The wireless network entity includes a MSS context controller, a memory, and a processor, where the MSS context controller is coupled to the memory and the processor. The MSS context controller is configured for receiving the first signaling message comprising at least one of session management (SM) context and mobility management (MM) context from the user equipment (UE) upon restarting the modem of the UE while accessing the wireless network using the modem service. The MSS context controller is configured for determining the connection socket context of an application used for accessing the wireless network entity using the modem service. The MSS context controller is configured for storing the connection socket context and at least one of the SM context and the MM context to the second storage area. The MSS context controller is configured for determining whether the UE supports the session and mobility management feature. The MSS context controller is configured for transmitting the second signaling message comprising at least one of the SM context and the MM context to the UE for continuity of the modem service upon determining that the UE supports the session and mobility management feature.

Accordingly, the embodiments herein provide a method for continuity of a modem service by a user equipment (UE). The method includes detecting a restart of a modem of the UE while accessing a wireless network using the modem service; determining whether a wireless network entity supports a session and mobility management feature upon detecting the restart of the modem; identifying session management (SM) context and mobility management (MM) context used by the UE for accessing the modem service upon determining that the wireless network entity supports the session and the mobility management feature; and transmitting a first signaling message comprising at least one of the SM context and the MM context to the wireless network entity for the continuity of the modem service.

Accordingly, the embodiments herein provide a method for continuity of the modem service by a wireless network entity. The method includes receiving a first signaling message comprising at least one of session management (SM) context and mobility management (MM) context from a user equipment (UE) upon restarting a modem of the UE while accessing a wireless network using the modem service; determining a connection socket context of an application used for accessing the wireless network upon receiving the first signaling message from the UE; storing the connection socket context and at least one of the SM context and the MM context to a second storage area; determining whether the UE supports a session and mobility management feature upon storing the connection socket context and the at least one of the SM context and the MM context to the second storage area; and transmitting a second signaling message comprising at least one of the SM context and the MM context to the UE for continuity of the modem service upon determining that the UE supports the session and the mobility management feature.

Accordingly, the embodiments herein provide the UE for continuity of the modem service by a user equipment (UE). The UE includes a memory; a modem; and a processor coupled to the memory and the modem, wherein the processor is configured to: detect a restart of the modem of the UE while accessing a wireless network using the modem service, determine whether a wireless network entity supports a session and mobility management feature upon detecting the restart of the modem, identify session management (SM) context and mobility management (MM) context used by the UE for accessing the modem service upon determining that the wireless network entity supports the session and the mobility management feature, and transmit a first signaling message comprising at least one of the SM context and the MM context to the wireless network entity for continuity of the modem service.

Accordingly, the embodiments herein provide the UE for continuity of the modem service by a wireless network entity. The wireless network entity includes a memory; a processor coupled to the memory, wherein the processor is configured to: receive a first signaling message comprising at least one of session management (SM) context and mobility management (MM) context from a user equipment (UE) upon restarting a modem of the UE while accessing a wireless network using the modem service, determine a connection socket context of an application used for accessing the wireless network entity using the modem service upon receiving the first signaling message from the UE, store the connection socket context and at least one of the SM context and the MM context to a second storage area, determine whether the UE supports a session and mobility management feature upon storing the connection socket context and the at least one of the SM context and the MM context to the second storage area, and transmit a second signaling message comprising at least one of the SM context and the MM context to the UE for continuity of the modem service upon determining that the UE supports the session and the mobility management feature.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

BRIEF DESCRIPTION OF DRAWINGS

This method and apparatus are illustrated in the accompanying drawings, throughout which like reference letters indicate corresponding parts in the various figures. The embodiments herein will be better understood from the following description with reference to the drawings, in which.

MODE FOR THE INVENTION

Figure 1A:
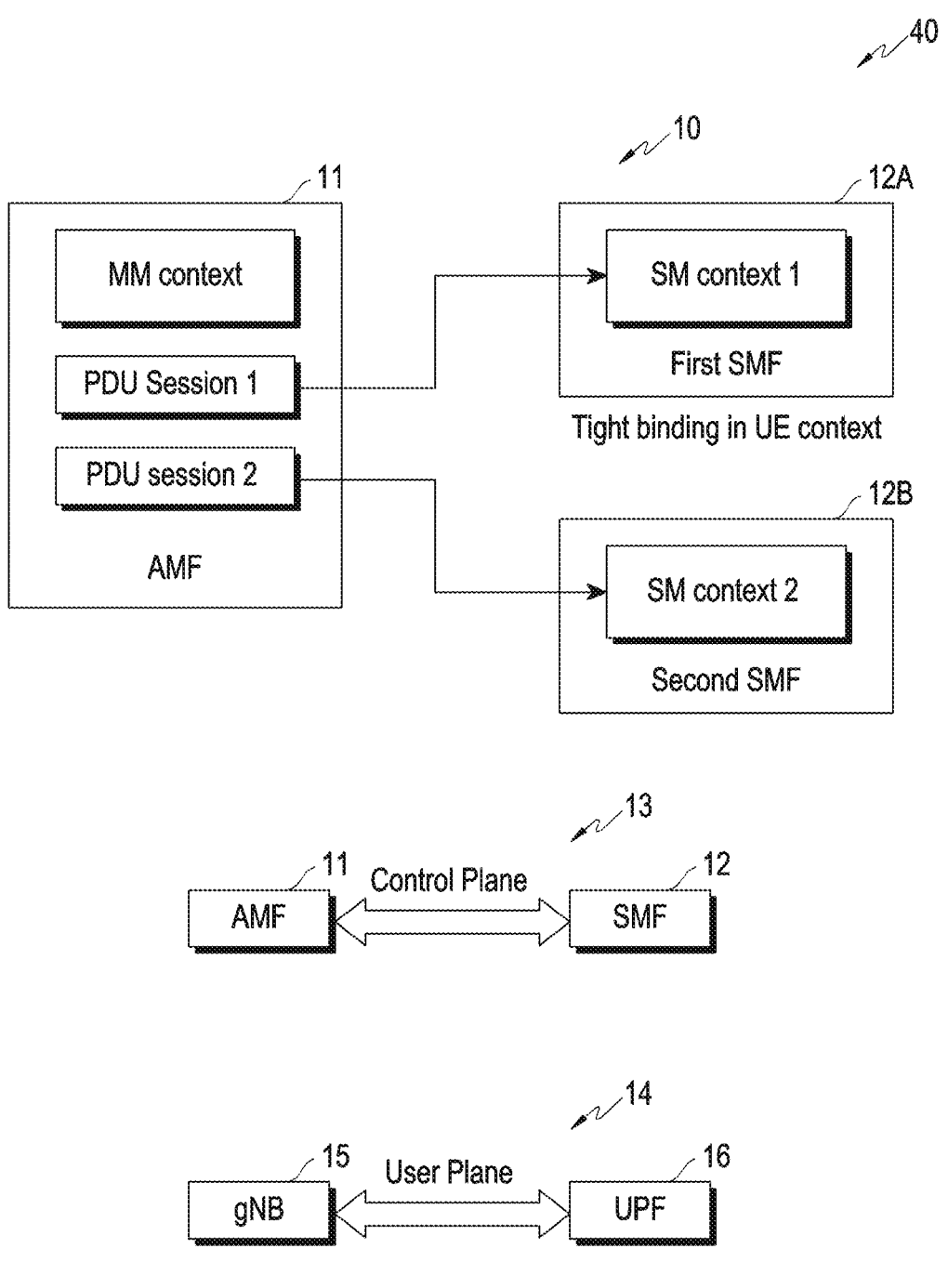
FIG. 1A illustrates an architectural diagram of a wireless network, according to a prior art.
Figure 1B:
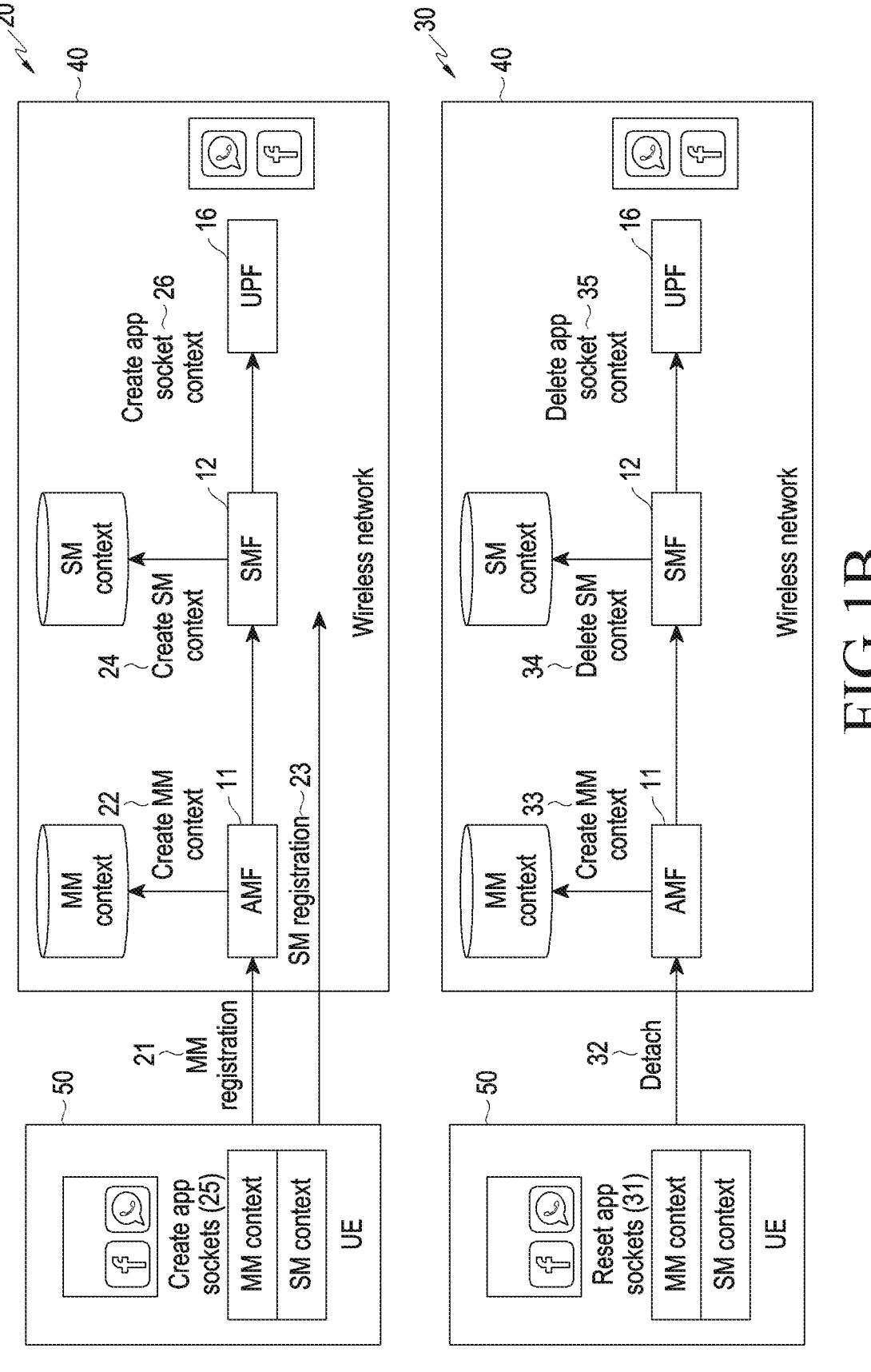
FIG. 1B is a flow diagram illustrating a method of creation and deletion of MM context and SM context at the wireless network, according to a prior art.
Figure 1C:
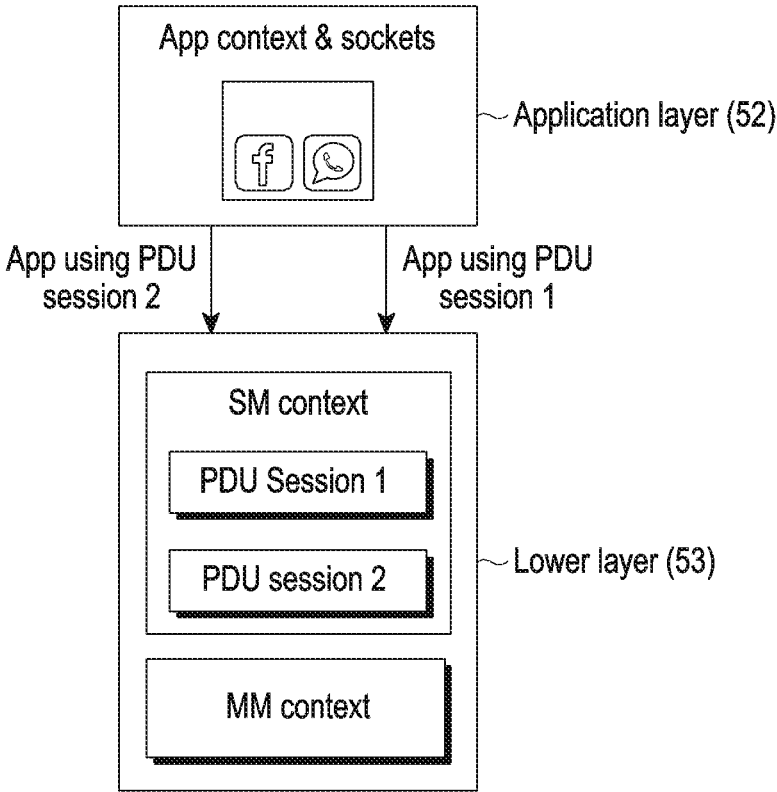
FIG. 1C illustrates an application layer and a lower layer of a UE, according to a prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a method for continuity of a modem service. The method includes detecting, by a user equipment (UE), a restart of a modem of the UE while accessing a wireless network using the modem service. The method includes determining, by the UE, whether a wireless network entity supports a session and mobility management feature. The method includes identifying, by the UE, session management (SM) context and mobility management (MM) context used by the UE for accessing the modem service upon determining that the wireless network entity supports the session and mobility management feature. The method includes transmitting, by the UE, a first signaling message comprising at least one of the SM context and the MM context to the wireless network entity for continuity of the modem service based on availability of the SM context and the MM context at the UE.

Accordingly, the embodiments herein provide a method for continuity of the modem service. The method includes receiving, by the wireless network entity, the first signaling message comprising at least one of session management (SM) context and mobility management (MM) context from the UE upon restarting the modem of the UE while accessing the wireless network using the modem service. The method includes determining, by the wireless network entity, a connection socket context of the application used for accessing the wireless network using the modem service. The method includes storing, by the wireless network entity, the connection socket context and at least one of the SM context and the MM context to a second storage area. The method includes determining, by the wireless network entity, whether the UE supports the session and mobility management feature. The method includes transmitting, by the wireless network entity, a second signaling message comprising at least one of the SM context and the MM context to the UE for continuity of the modem service upon determining that the UE supports the session and mobility management feature.

Accordingly, the embodiments herein provide the UE for continuity of the modem service. The UE includes a mobility session socket (MSS) context controller, a memory, a processor, and the modem, where the MSS context controller is coupled to the memory, the modem and the processor. The MSS context controller is configured for detecting the restart of the modem of the UE while accessing the wireless network using the modem service. The MSS context controller is configured for determining whether the wireless network entity supports the session and mobility management feature. The MSS context controller is configured for identifying session management (SM) context and mobility management (MM) context used by the UE for accessing the modem service upon determining that the wireless network entity supports the session and mobility management feature. The MSS context controller is configured for transmitting the first signaling message comprising at least one of the SM context and the MM context to the wireless network entity for continuity of the modem service based on availability of the SM context and the MM context at the UE.

Accordingly, the embodiments herein provide the wireless network entity for continuity of the modem service. The wireless network entity includes a MSS context controller, a memory, and a processor, where the MSS context controller is coupled to the memory and the processor. The MSS context controller is configured for receiving the first signaling message comprising at least one of session management (SM) context and mobility management (MM) context from the user equipment (UE) upon restarting the modem of the UE while accessing the wireless network using the modem service. The MSS context controller is configured for determining the connection socket context of an application used for accessing the wireless network entity using the modem service. The MSS context controller is configured for storing the connection socket context and at least one of the SM context and the MM context to the second storage area. The MSS context controller is configured for determining whether the UE supports the session and mobility management feature. The MSS context controller is configured for transmitting the second signaling message comprising at least one of the SM context and the MM context to the UE for continuity of the modem service upon determining that the UE supports the session and mobility management feature.

Unlike existing methods and systems, the proposed method optimizes the signaling and resource between 5G network nodes, and between 5G core and external/3rd party nodes. For example re-execution of procedures such as network slice specific authentication, AKMA related procedures that needs FFS, Edge related procedures, and other SA6 defined application-level procedures can be avoided by using the proposed method.

Unlike the existing methods and systems, a service activation time is drastically reduced for retaining an IP address of the UE using the proposed method, which is more critical for time sensitive applications etc.

Unlike the existing methods and systems, the proposed method provides application agnostic recovery i.e. a reset at the wireless network has zero impacts to application layer.

Referring now to the drawings, and more particularly to FIGS. 2A through 13, there are shown preferred embodiments.

Figure 2A:
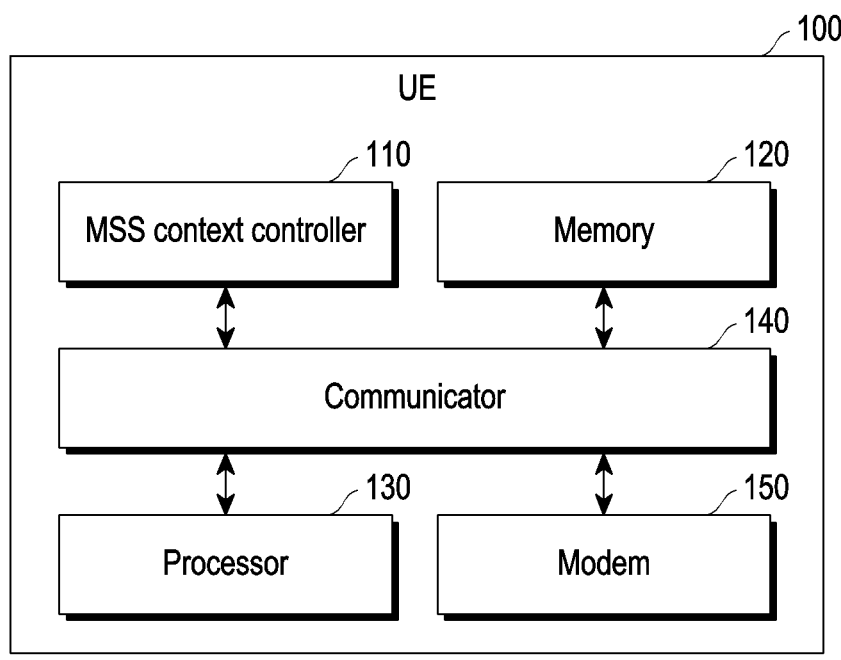
FIG. 2A is a block diagram of a UE for continuity of a modem service, according to an embodiment as disclosed herein.

FIG. 2A is a block diagram of a UE (100) for continuity of a modem service, according to an embodiment as disclosed herein. Examples of the UE (100) include, but are not limited to a smartphone, a tablet computer, a personal digital assistance (PDA), a desktop computer, an internet of things (IoT), a wearable device, etc. In an embodiment, the UE (100) includes a mobility session socket (MSS) context controller (110), a memory (120), a processor (130), a communicator (140), and a modem (150). The MSS context controller (110) is coupled to the memory (120), the processor (130), and the modem (150). The MSS context controller (110) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The MSS context controller (110) detects restart (i.e. reset/reboot) of the modem of the UE (100) while accessing a wireless network (400) using the modem service. The MSS context controller (110) determines whether an entity (herein called as wireless network entity) (200) of the wireless network (400) supports a session and mobility management feature. The feature support includes a wireless network broadcast System Information Block (SIB), a wireless network feature list, and a PDU can have indicate of auto recovery.

In an embodiment, the MSS context controller (110) receives a third signaling message comprising information of availability of the session and mobility management feature at the wireless network entity (200), a list of public land mobile networks (PLMNs) comprising the SM context, and a protocol data unit (PDU) or a data network (DNN) corresponds to the session and mobility management feature from the wireless network entity (200). Example of the third signaling message are an attach accept/tracking area update (TAU) accept/5G registration accept message, a broadcast or system information (SIBxy) information message, a PDU session establishment accept message, an attach/registration accept/reject message. Further, the MSS context controller (110) determines whether the wireless network entity (200) supports the session and mobility management feature based on the third signaling message.

In an embodiment, the wireless network entity (200) transmits the broadcast or system information (SIBxy) information message to the UE (100) including a new information element (IE) that indicates the MM-SM feature support of the wireless network entity (200). In another embodiment, the wireless network entity (200) indicates its MM-SM context feature support to the UE (100) in the attach/registration accept/reject message or any other non-access stratum (NAS) message including the new IE. In another embodiment, the wireless network entity (200) indicates for which a PDU/DNN feature is available by transmitting the PDU session establishment accept message includes the new IE. In an embodiment, the wireless network entity (200) indicates if the SM context fetching is possible from a list of PLMNs, where the PLMN list is broadcasted or provided in a non-access stratum (NAS)/access stratum (AS) signaling message to the UE (100).

In an embodiment, the UE (100) and a base station (200E) (i.e. wireless network entity (200)) negotiate the session and mobility management feature. The base station (200E) broadcasts the MM-SM feature support in SIBxy to the UE (100) for negotiation.

In another embodiment, the UE (100) and an access and mobility management function (AMF) (200A) (i.e. wireless network entity (200)) negotiate the session and mobility management feature. The UE (100) indicates its feature support to the AMF (200A) in the MM signaling. Further, the AMF (200A) indicates its feature support to the UE (100) in MM signaling.

In another embodiment, the UE (100) and a session management function (SMF) (200B) (i.e. wireless network entity (200)) negotiate the session and mobility management feature. The UE (100) indicates its feature support to the SMF (200B) SM signaling for each PDU/DNN. Further, the SMF (200B) indicates its feature support to the UE (100) in SM signaling for each DNN.

Alternatively, the UE (100) indicates the feature support in MM signaling to the wireless network entity (200).

The MSS context controller (110) identifies session management (SM) context and mobility management (MM) context used by the UE (100) for accessing the modem service upon determining that the wireless network entity (200) supports the session and mobility management feature.

The MSS context controller (110) transmits a first signaling message comprising the SM context and/or the MM context to the wireless network entity (200) for continuity of the modem service based on availability of the SM context and the MM context at the UE (100). An example of the first signaling message is a detach/deregister request message with a new IE that indicate its MM-SM feature support. In an embodiment, the MSS context controller (110) determines whether the SM context and/or the MM context is available at a first storage area (e.g. a subscriber identity module (SIM) or the memory (120)). Further, the MSS context controller (110) initiates a timer. Further, the MSS context controller (110) transmits the first signaling message comprising a timer value (also called as timer duration; e.g. 2 seconds, 3 minutes, etc.) and the SM context and/or the MM context to the wireless network entity (200) based on availability of the SM context and the MM context at the first storage area. In an embodiment, the MSS context controller (110) parses the stored SM context and/or the stored MM context using a new protocol upon determining that the SM context and/or the MM context is stored at the UE (100). Further, the MSS context controller (110) transmits the first signaling message (e.g. a service request for DRB assignment based on stored SM parameters) comprising the timer value and the SM context and/or the MM context to the wireless network entity (200). The timer expires by reaching the timer value from a zero unit (e.g. 0 second, 0 minute).

Upon not receiving a second signaling message comprising the SM context and/or the MM context from the wireless network entity (200) before expiry of the timer, the MSS context controller (110) terminates the timer, and transmits another signaling message for new SM and MM contexts. Further, the MSS context controller (110) deletes the SM context and/or the MM context from the first storage area in response to the expiry or termination of the timer.

Upon receiving the second signaling message comprising the SM context and/or the MM context from the wireless network entity (200) before expiry of the timer, the MSS context controller (110) terminates the timer, and continues accessing the wireless network (400) using the modem service based on the second signaling message. An example of the second signaling message is an attach accept/registration accept/PDU session establishment accept message. In an embodiment, the second signaling message is a registration/attach accept message including the SM context, or new NAS message container including the SM context, or the SM context in data packet for single/multiple PDN/DNNs.

In an embodiment, the MSS context controller (110) receives a fourth signaling message comprising availability of the SM context at the wireless network entity (200) and a packet data network (PDN) list from the wireless network entity (200). An example of the fourth signaling message is a registration/attach accept message. Further, the MSS context controller (110) transmits a fifth signaling message comprising an existing PDU and a context recovery information element to the wireless network entity (200). An example of the fifth signaling message is a request for PDU session establishment. Further, the MSS context controller (110) receives the second signaling message comprising an internet protocol (IP) and other parameters used for accessing the wireless network (400) from the wireless network entity (200).

In another embodiment, upon receiving the fourth signaling message, the MSS context controller (110) receives the second signaling message comprising an access point name (APN), a PDU session identifier (ID), an IP and other parameters used for accessing the wireless network (400) from the wireless network entity (200). In another embodiment, upon receiving the fourth signaling message, the MSS context controller (110) receives the second signaling message comprising a PDU context shared over a default bearer from the wireless network entity (200). In another embodiment, upon receiving the fourth signaling message, the MSS context controller (110) decouples the SM context and the MM context. Further, the MSS context controller (110) stores the connection socket context and the SM context and/or the MM context to the first storage area.

In an embodiment, the MSS context controller (110) configures the UE (100) to shift from a 5GMM-DEREGISTERED state to 5GMM-REGISTERED.UPDATE-NEEDED state, or an EMM-DEREGISTERED state to EMMREGISTERED.UPDATE-NEEDED state based on the stored MM context. In an embodiment, the MSS context controller (110) reinitialises the MM state machine based on the stored context, where the MM state machine is stored and same state can be used for initiating MM message by the UE (100).

The memory (120) stores instructions to be executed by the processor (130). The memory (120) may include non-volatile storage elements. Examples of such nonflash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in random access memory (RAM) or cache). The memory (120) can be an internal storage unit or it can be an external storage unit of the UE (100), a cloud storage, or any other type of external storage.

The processor (130) is configured to execute instructions stored in the memory (120). The processor (130) may be a general-purpose processor, such as a central processing unit (CPU), an application processor (AP), or the like, a graphics-only processing unit such as a graphics processing unit (GPU), a visual processing unit (VPU) and the like. The processor (130) may include multiple cores to execute the instructions. The communicator (140) is configured for communicating internally between hardware components in the UE (100). Further, the communicator (140) is configured to facilitate the communication between the UE (100) and other devices via one or more networks (e.g. Radio technology). The communicator (140) includes an electronic circuit specific to a standard that enables wired or wireless communication. The processor (130) may include the MSS context controller (110).

Although the FIG. 2A shows the hardware components of the UE (100) but it is to be understood that other embodiments are not limited thereon. In other embodiments, the UE (100) may include less or a greater number of components. Further, the labels or names of the components are used only for illustrative purpose and does not limit the scope of the invention. One or more components can be combined together to perform same or substantially similar function for continuity of the modem service.

Figure 2B:
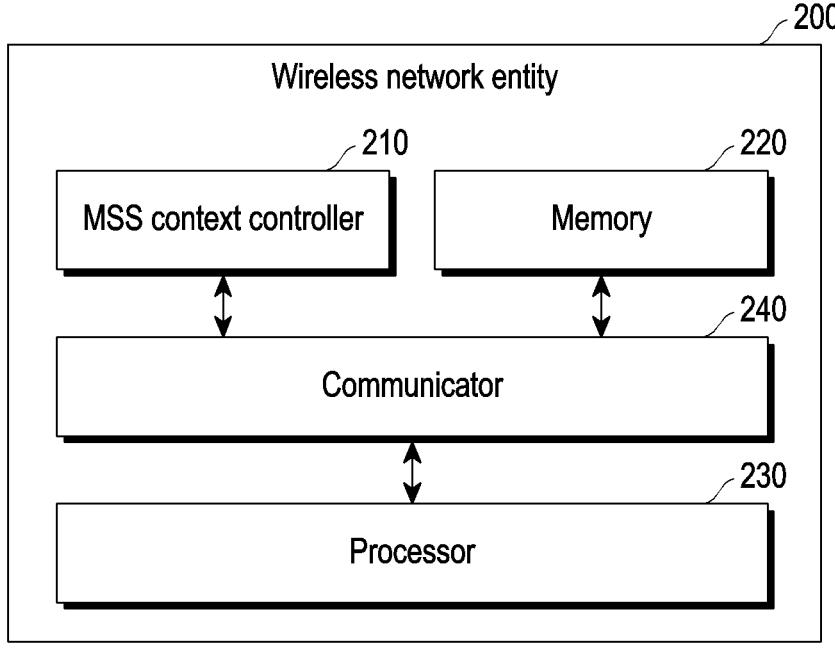
FIG. 2B is a block diagram of a wireless network entity for continuity of the modem service, according to an embodiment as disclosed herein.

FIG. 2B is a block diagram of the wireless network entity (200) for continuity of the modem service, according to an embodiment as disclosed herein. Examples of the wireless network entity (200) include, but are not limited to the AMF (200A), the SMF (200B), a user plane function (UPF) (200C), a central repository (200D), a base station (200E), etc. examples for the central repository (200D) are unified data management (UDM)/unified data repository (UDR) or a new storage. In an embodiment, the wireless network entity (200) includes a mobility session socket (MSS) context controller (210), a memory (220), a processor (230), and a communicator (240). The MSS context controller (210) is coupled to the memory (220), and the processor (230). The MSS context controller (210) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The MSS context controller (210) receives the first signaling message comprising the session management (SM) context and/or the mobility management (MM) context from the UE (100) upon restarting the modem (150) of the UE (100) while accessing a wireless network (400) using the modem service. The MSS context controller (210) determines the connection socket context of the application used for accessing the wireless network entity (200) using the modem service. The MSS context controller (210) stores the connection socket context and the SM context and/or the MM context to a second storage area (e.g. memory 220). In an embodiment, the second storage area is located at the AMF (200A), the SMF (200B), the UPF (200C), the central repository (200D), the base station (200E) of the wireless network (400).

The MSS context controller (210) determines whether the UE (100) supports the session and mobility management feature. In an embodiment, the MSS context controller (210) receives the third signaling message comprising information of availability of the session and mobility management feature at the UE (100), and a protocol data unit (PDU) or a data network (DNN) corresponds to the session and mobility management feature from the UE (100). Further, the MSS context controller (210) determines whether the UE (100) supports the session and mobility management feature based on the third signaling message.

In an embodiment, the UE (100) indicates the MM-SM feature support to the wireless network entity (200) in a NAS/AS signaling message like UE capability IE, where the UE capability indicates if the UE (100) can store the MM context or the SM context or both. In another embodiment, the UE (100) indicates for which PDU/DNN the MM-SM feature is needed, where the feature can be enabled/disabled from OTA signaling, SIM EF, or any NV parameters. In an embodiment, a base station (200E) which is the wireless network entity (200) receives an attach request/TAU request/5G registration request message includes the new IE that indicate the MM-SM feature support of the UE (100) from the UE (100). Further, the base station (200E) transmits the attach accept/TAU accept/5G registration accept message includes the new IE that indicate the MM-SM feature support of the wireless network (400) to the UE (100).

The MSS context controller (210) transmits the second signaling message comprising the SM context and/or the MM context to the UE (100) for continuity of the modem service upon determining that the UE (100) supports the session and mobility management feature. In an embodiment, the MSS context controller (210) determines the timer value from the first signaling message. Further, the MSS context controller (210) initiates a timer based on the timer value, where the wireless network entity (200) can modify the timer value and configure the modified timer value at the UE (100).

Upon receiving the registration request message with new IE to get same SM parameters used by the UE (100) previously at the wireless network entity (200), the MSS context controller (110) parses the stored SM context and/or the stored MM context using the new protocol. Further, the MSS context controller (210) determines the stored SM context and/or the stored MM context is parsed before expiry of the timer. Further, the MSS context controller (210) transmits the second signaling message by including the SM context and/or the MM context before expiry of the timer and terminates the timer, upon determining that the stored SM context and/or the stored MM context is parsed before expiry of the timer. Alternatively, the MSS context controller (210) transmits the second signaling message without including the SM context and/or the MM context and terminates the timer, upon determining that the stored SM context and the stored MM context is not parsed before expiry of the timer. The MSS context controller (210) deletes the SM context and the MM context from the second storage area in response to the expiry or termination of the timer.

In an embodiment, the MSS context controller (210) transmits the fourth signaling message comprising the availability of the SM context at the wireless network entity (200) and the packet data network (PDN) list to the UE (100). Further, the MSS context controller (210) receives a fifth signaling message comprising an existing PDU and a context recovery information element from the UE (100). Further, the MSS context controller (210) transmits the second signaling message comprising an internet protocol (IP) and other parameters used by the UE (100) for accessing the wireless network (400) to the UE (100). In another embodiment, upon transmitting the fourth signaling message, the MSS context controller (210) transmits the second signaling message comprising the access point name (APN), the PDU session identifier (ID), the IP and the other parameters used for accessing the wireless network (400) to the UE (100). In another embodiment, upon transmitting the fourth signaling message, the MSS context controller (210) transmits the second signaling message comprising the PDU context shared over the default bearer to the UE (100). In an embodiment, when the SM context is stored at the central repository (200D), then the AMF (200A) fetches the SM context from the central repository (200D) for providing the SM context to the UE (100).

The memory (220) stores instructions to be executed by the processor (230). The memory (220) may include nonvolatile storage elements. Examples of such nonflash memories, or forms of electrically programmable memories (EPROM) or electrically erasable and programmable (EEPROM) memories. In addition, the memory (220) may, in some examples, be considered a non-transitory storage medium. The term "non-transitory" may indicate that the storage medium is not embodied in a carrier wave or a propagated signal. However, the term "non-transitory" should not be interpreted that the memory (220) is non-movable. In some examples, the memory (220) can be configured to store larger amounts of information than its storage space. In certain examples, a non-transitory storage medium may store data that can, over time, change (e.g., in random access memory (RAM) or cache). The memory (220) can be an internal storage unit or it can be an external storage unit of the wireless network entity (200), a cloud storage, or any other type of external storage.

The processor (230) is configured to execute instructions stored in the memory (220). The processor (230) may be a general-purpose processor, such as a central processing unit (CPU), an application processor (AP), or the like, a graphics-only processing unit such as a graphics processing unit (GPU), a visual processing unit (VPU) and the like. The processor (230) may include multiple cores to execute the instructions. The processor (230) may include the MSS context controller (210). The communicator (240) is configured for communicating internally between hardware components in the wireless network entity (200). Further, the communicator (240) is configured to facilitate the communication between the wireless network entity (200) and other devices via one or more networks (e.g. radio technology). The communicator (240) includes an electronic circuit specific to a standard that enables wired or wireless communication.

Although the FIG. 2B shows the hardware components of the wireless network entity (200) but it is to be understood that other embodiments are not limited thereon. In other embodiments, the wireless network entity (200) may include less or a greater number of components. Further, the labels or names of the components are used only for illustrative purpose and does not limit the scope of the invention. One or more components can be combined together to perform same or substantially similar function for continuity of the modem service.

Figure 3:
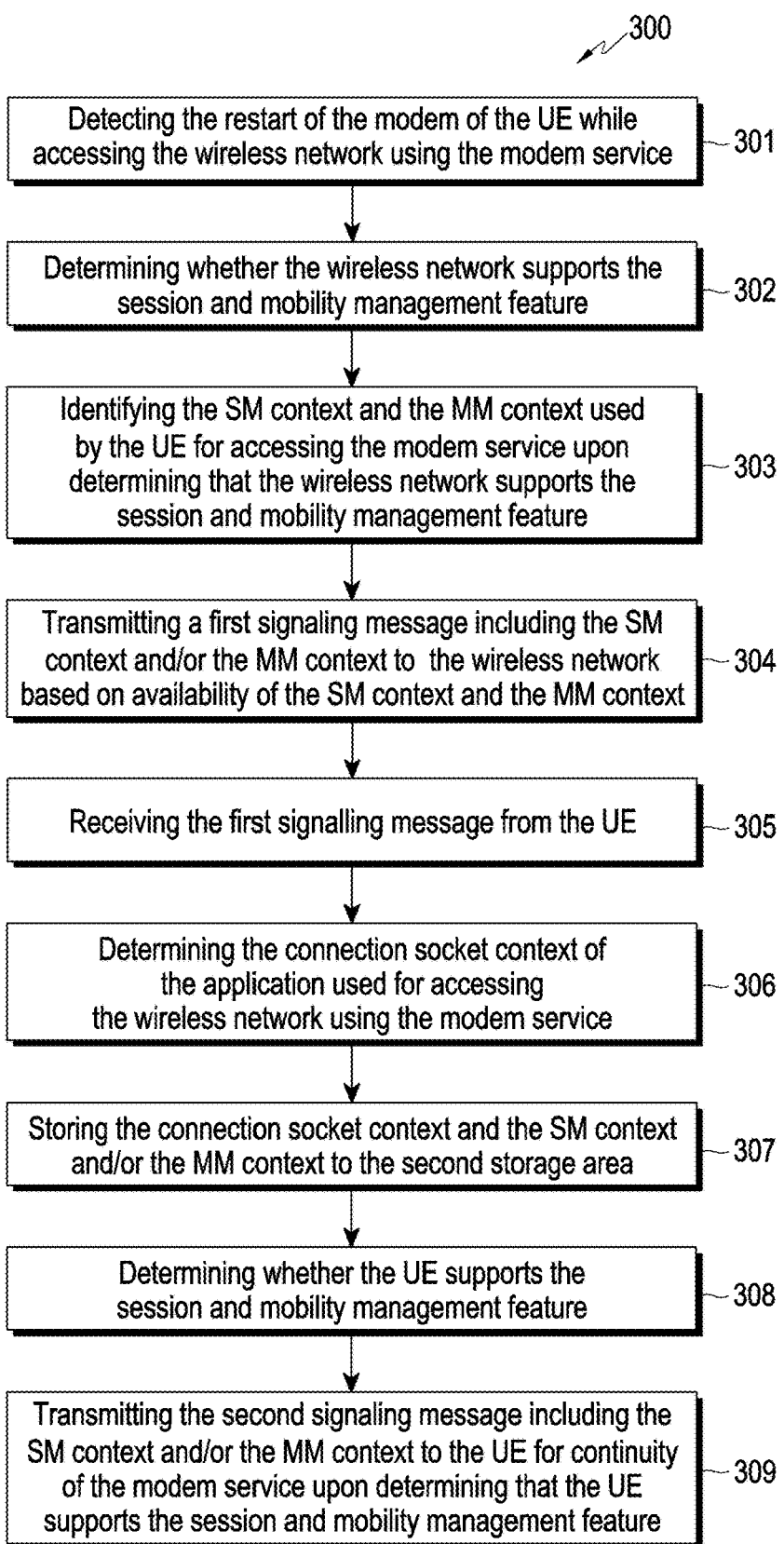
FIG. 3 is a flow diagram illustrating a method for continuity of the modem service, according to an embodiment as disclosed herein.

FIG. 3 is a flow diagram (300) illustrating a method for continuity of the modem service, according to an embodiment as disclosed herein. In an embodiment, the method allows the MSS context controller (110) to perform steps 301-304 of the flow diagram (300), the MSS context controller (210) to perform steps 305-309 of the flow diagram (300). At step 301, the method includes detecting the restart of the modem (150) of the UE (100) while accessing the wireless network (400) using the modem service. At step 302, the method includes determining whether the wireless network (400) supports the session and mobility management feature. At step 303, the method includes identifying the SM context and the MM context used by the UE (100) for accessing the modem service upon determining that the wireless network (400) supports the session and mobility management feature.

At step 304, the method includes transmitting the first signaling message including the SM context and/or the MM context to the wireless network (400) based on the availability of the SM context and the MM context. At step 305, the method includes receiving the first signaling message from the UE (100). At step 306, the method includes determining the connection socket context of the application used for accessing the wireless network (400) using the modem service. At step 307, the method includes storing the connection socket context and the SM context and/or the MM context to the second storage area. At step 308, the method includes determining whether the UE (100) supports the session and mobility management feature. At step 309, the method includes transmitting the second signaling message including the SM context and/or the MM context to the UE (100) for continuity of the modem service upon determining that the UE (100) supports the session and mobility management feature.

The various actions, acts, blocks, steps, or the like in the flow diagram (300) may be performed in the order presented, in a different order, or simultaneously. Further, in some embodiments, some of the actions, acts, blocks, steps, or the like may be omitted, added, modified, skipped, or the like without departing from the scope of the invention.

Figure 4:
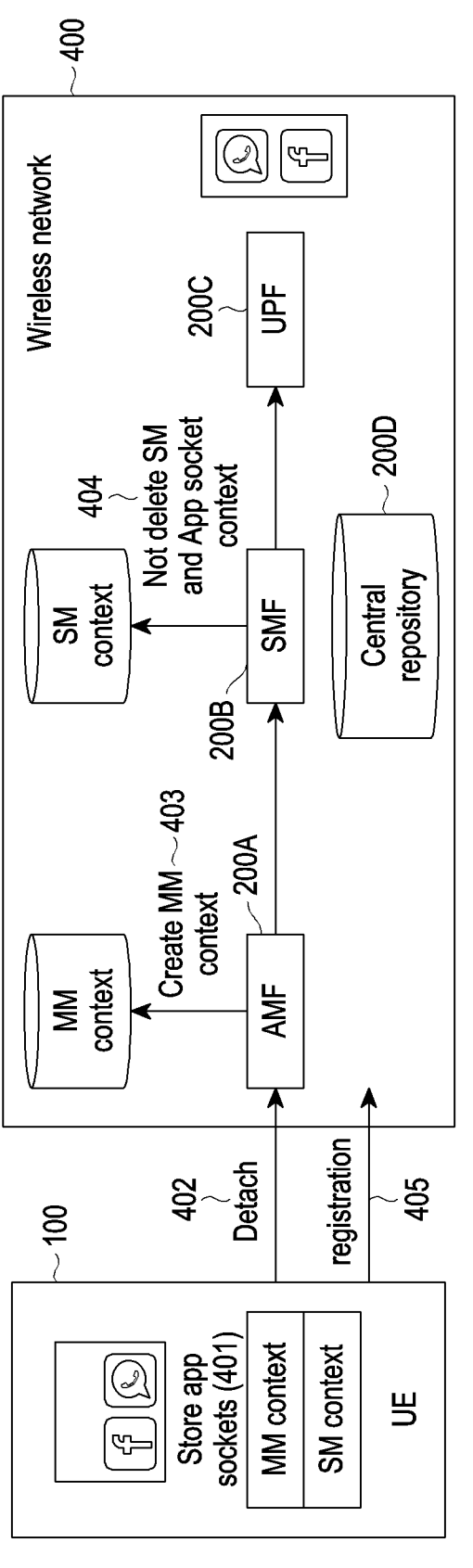
FIG. 4 is a flow diagram illustrating a method for maintaining the SM context and App socket context at the wireless network upon receiving a detach/deregister message from the UE, according to an embodiment as disclosed herein.

FIG. 4 is a flow diagram illustrating a method for maintaining the SM context and the App socket context at the wireless network (40) upon receiving a detach/deregister message from the UE (100), according to an embodiment as disclosed herein. Consider, the UE (100) is connected to the wireless network (400), and established an application session, where the UE (100) and the wireless network (400) contains the SM context, the MM context, and the App socket context. Consider, the modem (150) of the UE (100) is restarted later. At 401, the UE (100) decouples the SM and MM contexts, deletes the MM context, and stores the App socket and the SM context. At 402, the UE (100) requests to the AMF (200A) to detach followed by re-attach. At 403-404, the AMF (200A) deletes the MM context upon receiving the request, but does not configure the SMF (200B) to delete the SM context, and the UPF (200C) to delete the App socket context. Thus, the SM context and the App socket context continue to store at the wireless network (400).

Radio/core network tunnels remains intact and socket connections to application servers are stored at the wireless network (400). The AMF (200A) is having the SM context information for each PDU session. When the MM context is deleted, there is no impact on the active SM context and the PDU session-SMF mapping stored in the AMF (200A). The SM context mapping can be stored in the central repository (like UDM/UDR or new storage) (200D) to make independent from the AMF (200A). The AMF (200A) stores/fetches mapping PDU session related mapping information and retrieves previous SM context using information stored in the mapping table. During mobility a new AMF can fetch the UE PDU session mapping using UE identity. The UE (100) can be deregistered, but the AMF (200A) keeps the SM context information for some interval that is pre-defined or configurable or negotiated with the UE).

The MM context state changes will not have any impact on the SM contexts and the SM states. The MM context can change from registered to deregistered and to registered, and there won't be any impact on the SM context. At 405, the UE (100) transmits request to the AMF (200A) to register with the same SM context and App socket context after the detach procedure to continue the application session without a break. The UE (100) continues data services after moving back to registered state, where the SM and App socket contexts remains same and the MM context/state change will have no impact on the SM context.

In an embodiment, when the modem reset occurs, then the UE (100) stores the UE's SM context on the UE's USIM/ME even though the deregistration/detach procedure is performed by the UE (100). Alternatively, if the UE (100) wants to retain the SM context, then the UE (100) indicates to the wireless network (400) in detach/deregistration message with addition of the new IE in the detach/deregistration message, so that the wireless network (400) retains the UE's SM context and the SM context/SM PDU sessions associated with the UE (100) are not deactivated. The UE (100) transmits the SM context timer in the detach/deregistration message and the UE (100) tries for reattach within the SM context timer duration. Further, the wireless network (400) stores the UE's SM context for the requested SM context timer duration. The SM & MM contexts are decoupled at the UE (100), and the UE (100) triggers the attach/registration/ TAU/NAS message using the stored MM context parameters, includes the new IE to inform the wireless network (400) that the UE (100) is having the MM context.

Also the attach/registration/TAU/NAS message indicates to the wireless network (400) for assigning same SM parameters used by the UE (100) previously. The UE (100) moves from the 5GMM-DEREGISTERED state to the 5GMM-DEREGISTERED.REGISTRATION-NEEDED state or the EMM-DEREGISTERED state to the EMM-DEREGISTERED.ATTACH-NEEDED state based on the stored MM context parameters.

In an embodiment, when the UE (100) stores the MM context and not stores the SM context, then the UE (100) initializes the MM state machine based on the stored context. The UE (100) can store the MM context in the SIM, and the MM state variable in the memory (120). The UE (100) can move from MM de-registered to MM registered-attach needed or MM-registered TAU needed state based on MM context stored parameters. The UE (100) triggers the attach/ registration/TAU/NAS message using the stored MM context parameters includes the new IE to inform the wireless network (400) that the UE (100) is having the MM context. Also, the attach/registration/TAU/NAS message indicates to the wireless network (400) for assigning same SM parameters used by the UE (100) previously.

Figure 10:
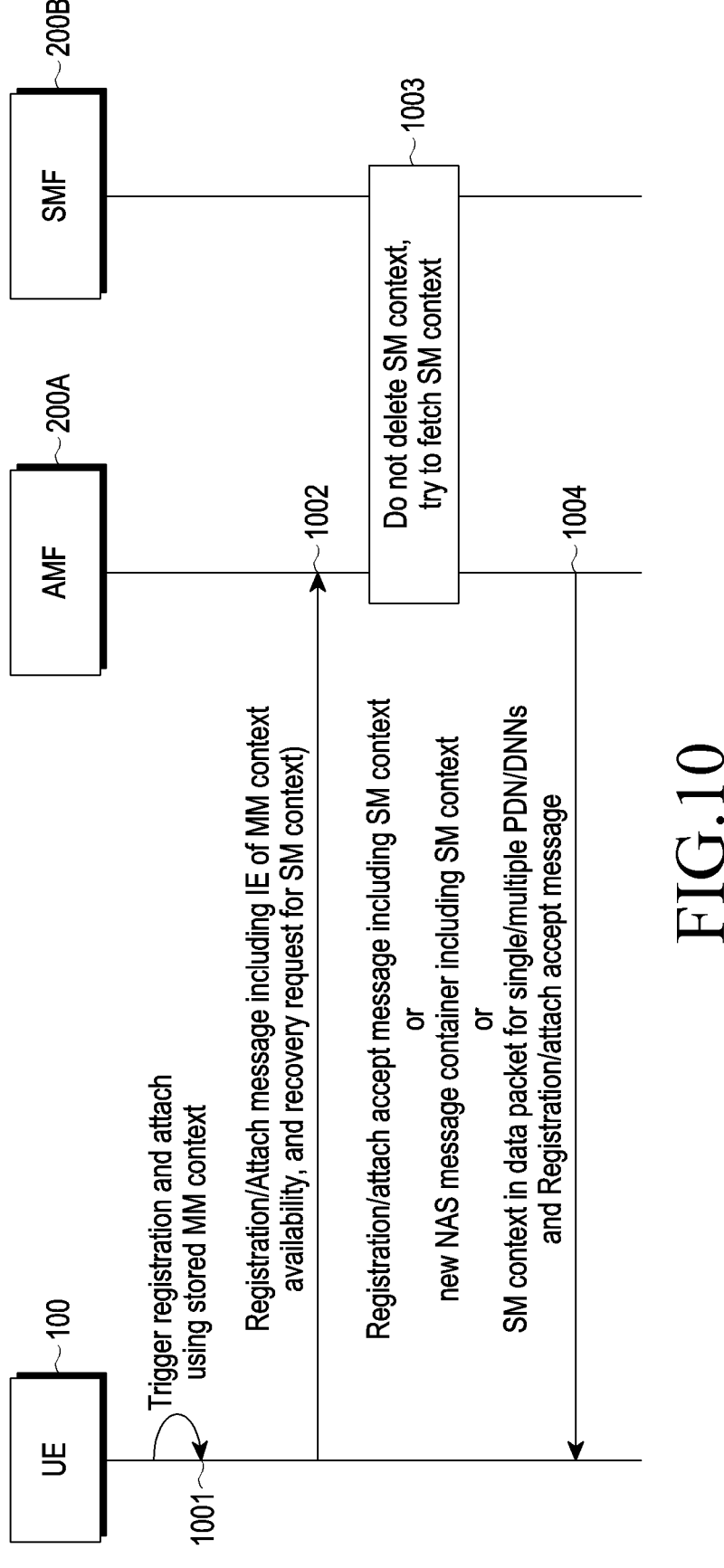
FIG. 10 is a sequential diagram illustrating a method of obtaining the SM context by the UE for the service continuity, according to an embodiment as disclosed herein.

Further, the wireless network (400) provides the SM context parameters for all active PDNs/DNNs to the UE (100) using NAS signaling or any other message container or in any data packet according to the sequential diagram in FIG. 10, where the message container can be encoded/ decoded.

Figure 11:
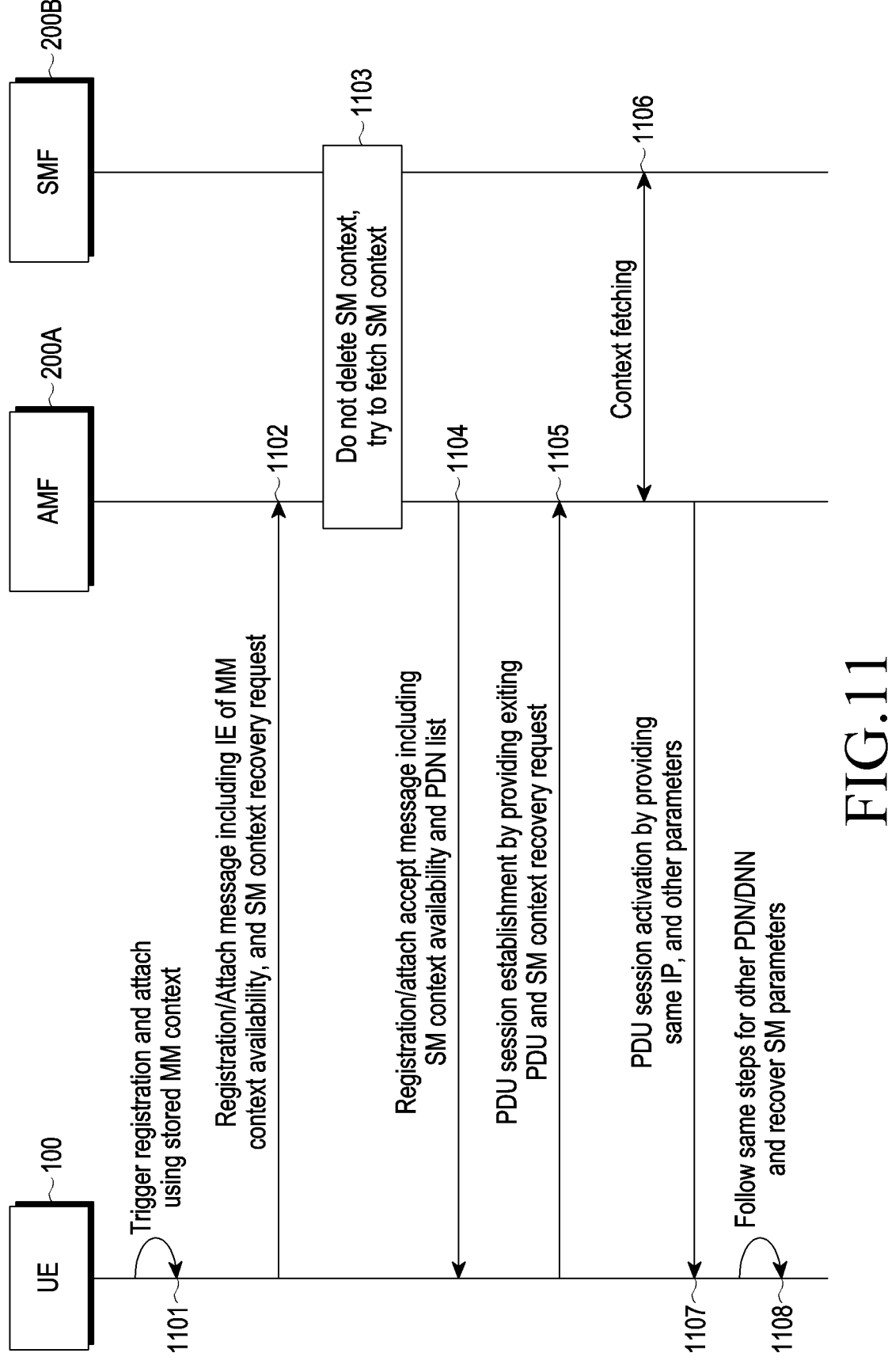
FIG. 11 is a sequential diagram illustrating a method of obtaining an IP address, and other parameters by the UE for the service continuity, according to an embodiment as disclosed herein.

Alternatively, the UE (100) initiates SM signaling for each PDN and includes the new IE for requesting previous SM context according to the sequential diagram in FIG. 11. Further, the wireless network (400) provides the PDN/DNN parameters for each PDN. If the parameter is not available, then the wireless network (400) indicates to the UE (100) or rejects the UE request. Further, the UE (100) can initiate fresh PDN/DNN based on the response from the wireless network (400).

Figure 12:
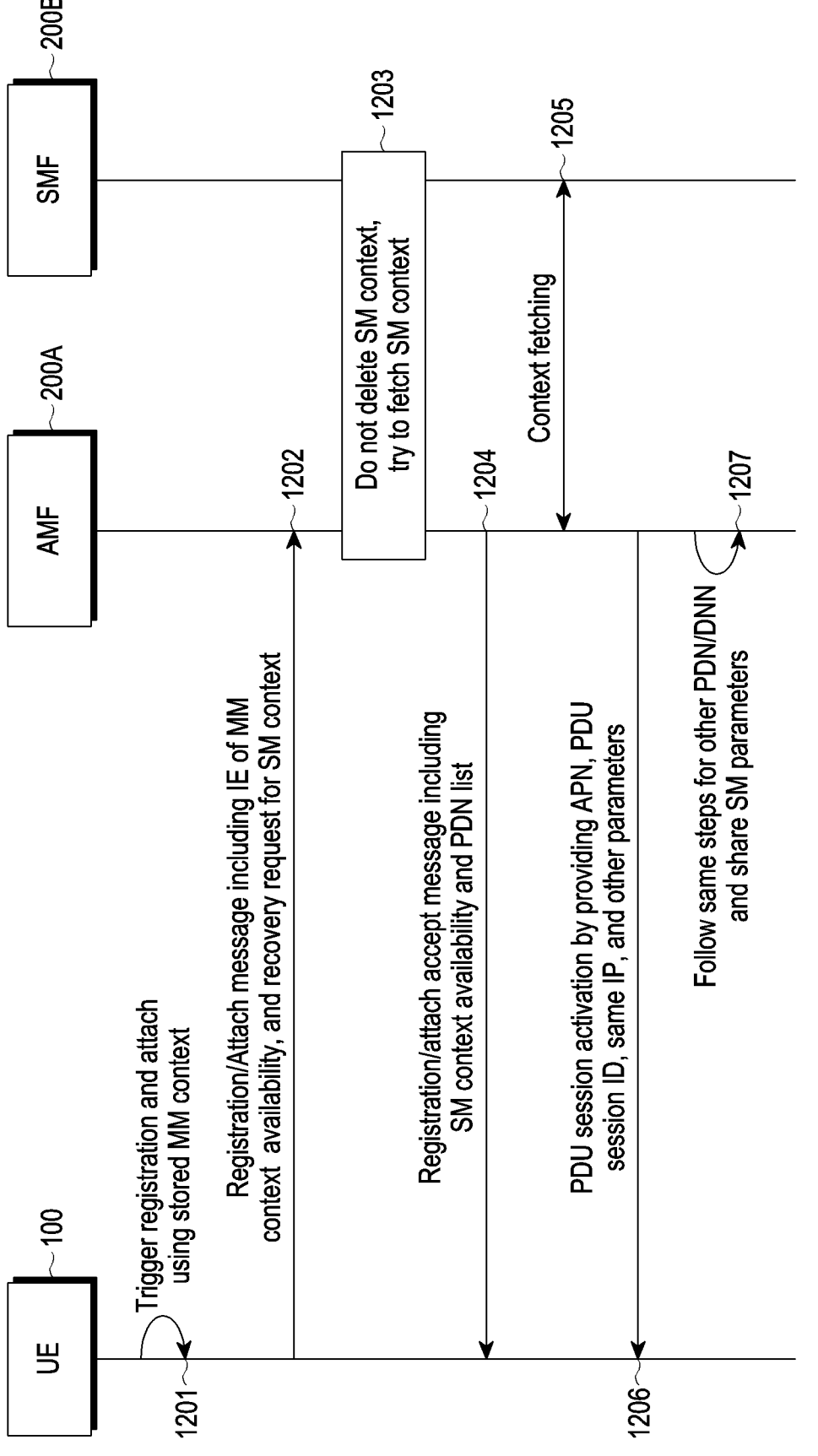
FIG. 12 is a sequential diagram illustrating a method of obtaining an APN, a PDU session ID, the IP address, and the other parameters by the UE for the service continuity, according to an embodiment as disclosed herein.

Alternatively, the wireless network (400) directly transmits the SM context activation request for all active PDNs without any signaling from the wireless network (400) according to the sequential diagram in FIG. 12.

Figure 13:
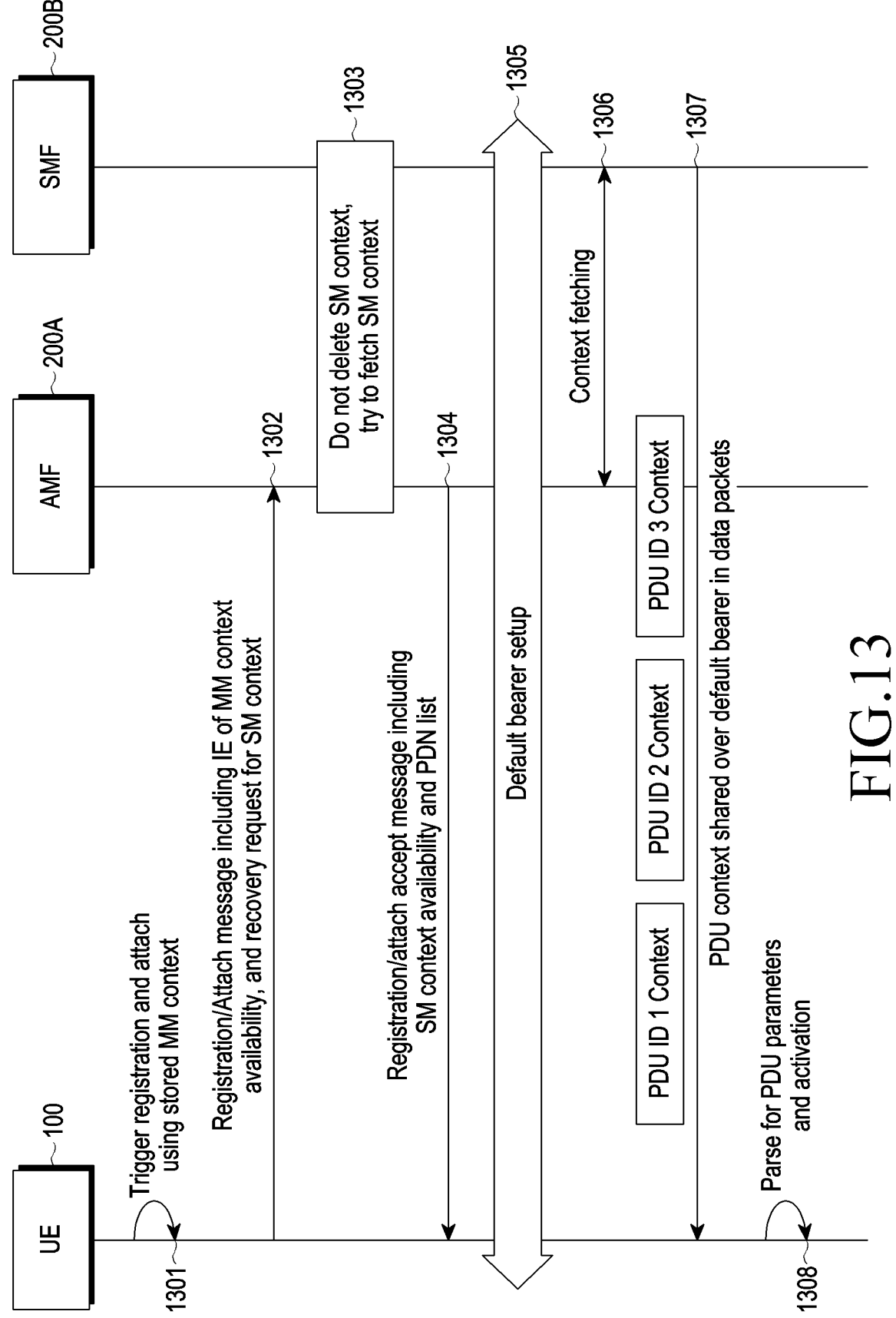
FIG. 13 is a sequential diagram illustrating a method of obtaining PDU context by the UE for the service continuity, according to an embodiment as disclosed herein.

Alternatively, the wireless network (400) activates the default bearer and other PDN context is shared as data packets over this PDN according to the sequential diagram in FIG. 13. The modem (150) passes received SM parameters to the application, and the application can further continue using the previous context if same IP layer parameters are assigned.

In an embodiment, when the UE (100) does not store the MM context and stores the SM context, then the UE (100) triggers the attach/NAS message and indicates to the wireless network (400) for assigning same SM parameters used by the UE (100) previously according to the sequential diagram in FIG. 11. The wireless network (400) indicates in the attach/registration accept/NAS message that the SM parameters are still valid and active PDU status.

Further, the wireless network (400) indicates the UE (100) to request the SM context parameters for each PDU. The UE (100) triggers the SM signaling once again and indicates existing PDU. Further, the wireless network (400) provides same stored parameters to the UE (100) using SM signaling. During IRAT, the UE (100) indicates that the attach/registration is for retrieving the SM context. Further, the wireless network (400) checks for previous RAT where the SM context was active using HSS stored information and shall fetch SM/MM context from previous nodes. During PLMN change, a new PLMN indicates if the SM context can be fetched on the new PLMN and a list of PLMNs for which the SM context fetching is possible.

In an embodiment, when the UE (100) does not store the MM context and the SM context, then the UE (100) triggers the attach/NAS message, indicates to the wireless network (400) for assigning same SM parameters used by the UE (100) previously, and indicates the SM context status as not available to the wireless network (400) but wants to receive same SM parameters.

Further, the wireless network (400) provides the SM context parameters for all active PDNs/DNNs to the UE (100) using NAS signaling or any other message container or in any data packet according to the sequential diagram in FIG. 10, where the message container can be encoded/ decoded.

Alternatively, the UE (100) initiate SM signaling for each PDN and includes the new IE for requesting previous context according to the sequential diagram in FIG. 11. Further, the wireless network (400) provides the PDN/DNN parameters for each PDN. If the parameter is not available, then the wireless network (400) indicates to the UE (100) or reject the UE request. Further, the UE (100) can initiate fresh PDN/DNN based on the response from the wireless network (400).

Alternatively, the wireless network (400) directly transmits the SM context activation request for all active PDNs without any signaling from the wireless network (400) according to the sequential diagram in FIG. 12.

Alternatively, the wireless network (400) activates the default bearer and other PDN context is shared as data packets over this PDN according to the sequential diagram in FIG. 13. The modem (150) passes received SM parameters to the application, and the application can further continue using the previous context if same IP layer parameters are assigned.

In an embodiment, when the UE (100) stores the MM context and the SM context, then the UE (100) triggers the attach/NAS message, indicates to the wireless network (400) for assigning same SM parameters used by the UE (100) previously and indicates the SM context status as available to the wireless network (400). The wireless network (400) indicates in the attach/registration accept/NAS message that the SM parameters are still valid and same context can be used.

Further, the wireless network (400) checks with the UE (100) to transmit SM activation request once again, where the wireless network (400) provides same stored parameters to the UE (100) using SM signaling according to the sequential diagram in FIG. 11. If the service request is performed using the stored MM context, then TAU is used for recovery if service request fails. A MSIM suspend indication can also be used and then resume after reboot of the modem (150). During PLMN change, the attach indicates to a new wireless network that the SM context should be retrieved. Then PLMN indicates the SM context available for other PLMNs in broadcast information then the UE (100) tries for recovery.

Figure 5A:
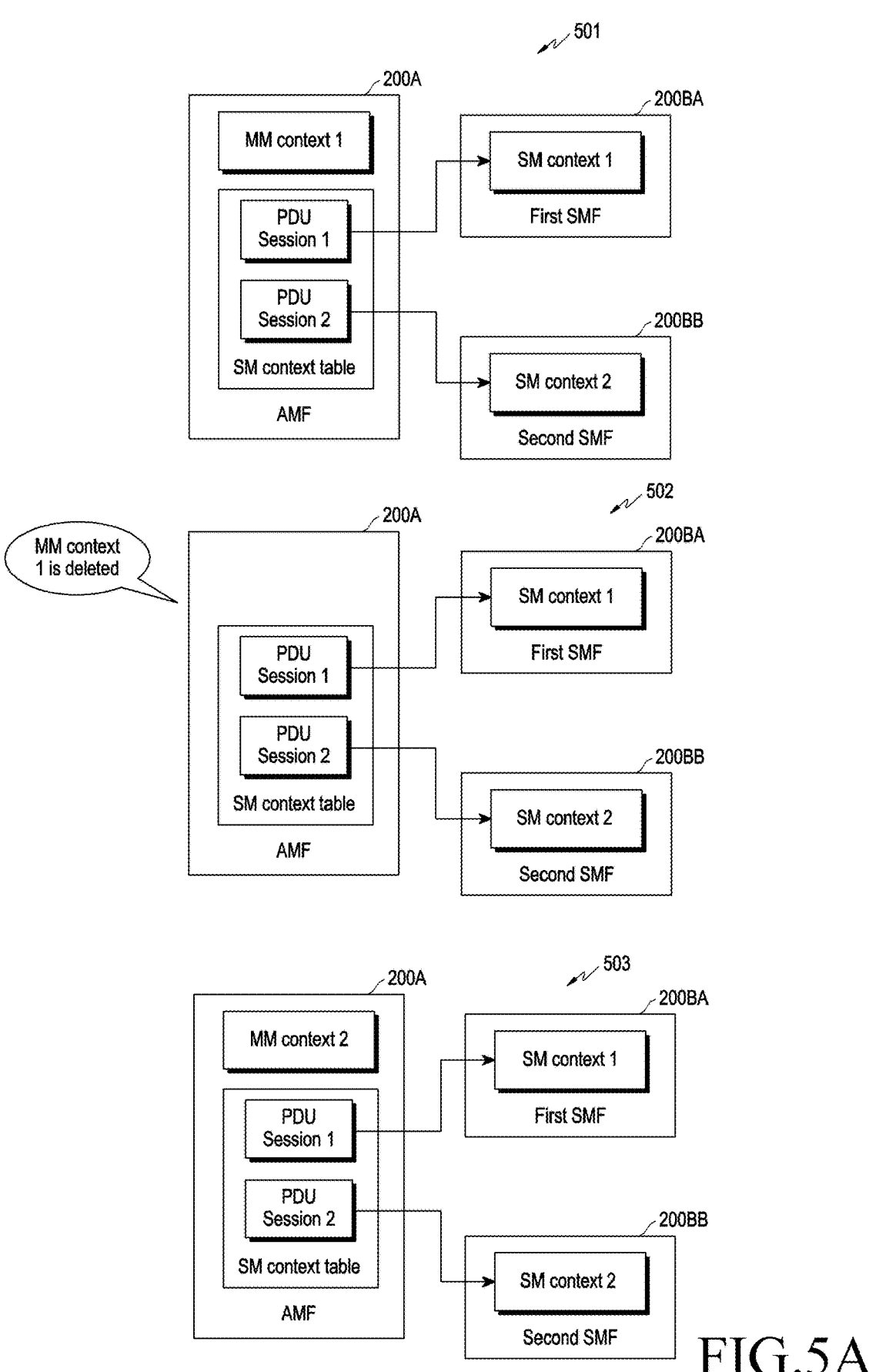
FIG. 5A illustrates an example scenario of maintaining the SM context by an AMF of the wireless network, according to an embodiment as disclosed herein.

FIG. 5A illustrates an example scenario of maintaining the SM context by the AMF (200A) of the wireless network (400), according to an embodiment as disclosed herein. As shown in 501, the AMF (200A) decouples the SM contexts (SM context 1 and SM context 2) and a MM context 1 used for PDU sessions (PDU session 1 and PDU session 2), and stores a mapping of the SM contexts of each PDU session to a SM context table, where the SMFs (first SMF (200BA) and the second SMF (200BB)) store the decoupled SM contexts. When the UE (100) is registered to the wireless network (400), then the AMF (200A) is having PDU session IDs and corresponding SMF address/mapping in the SM context table. The UE Apps are connected and the Apps get service over PDU sessions.

Consider, the modem reset/reboot/restart occurs later, then the UE triggers the detach/deregister procedure. When the UE (100) is de-registered, but the AMF (200A) keeps the PDU session IDs and corresponding the SMF address/ mapping. The UE Apps are unaware with the MM state, where the MM layer in UE (100) tries for recovery. As shown in 502, the AMF (200A) deletes the MM context 1 as part of the detach procedure. Unlike to the conventional wireless network (40), the deletion of the MM context 1 does not impacts on the SM context in the proposed wireless network (400). Even the MM context 1 is deleted, the SM contexts (SM context 1 and SM context 2) retains in the SMFs.

Consider, the UE (100) further initiates registration procedure with the wireless network (400) after detaching from the wireless network (400). As shown in 503, the AMF (200A) creates a new MM context i.e. MM context 2. When the UE (100) is registered again and the new MM context is created, then the AMF (200A) keeps the PDU session IDs and corresponding SMF address/mapping. Further, the AMF (200A) analyses the mapping in the SM context table, and fetches the SM contexts (SM context 1 and SM context 2) from the SMFs (first SMF (200BA) and the second SMF (200BB)). Further, the AMF (200A) transfers the new MM context and the previous SM contexts (SM context 1 and SM context 2) to the UE (100). The UE (100) further uses the new MM context and the SM contexts (SM context 1 and SM context 2) for resuming the model service without service continuity break. The UE Apps are unaware with the MM state recovery, where the UE Apps remains active and resumes services, and the service continuity is maintained.

Figure 5B:
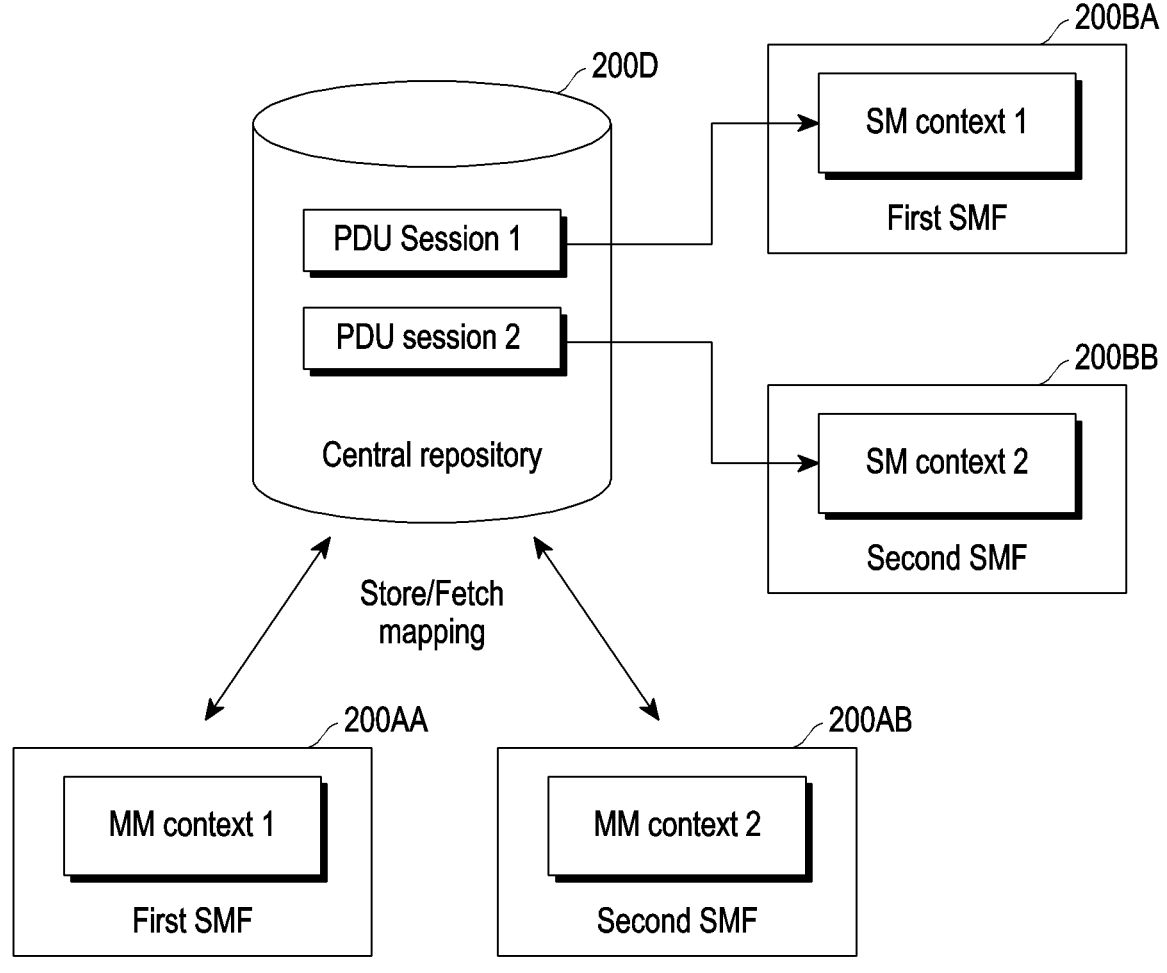
FIG. 5B illustrates an example scenario of maintaining the SM context by a central repository of the wireless network, according to an embodiment as disclosed herein.

FIG. 5B illustrates an example scenario of maintaining the SM context by the central repository (200D) of the wireless network (400), according to an embodiment as disclosed herein. According to an embodiment disclosed in the FIG. 5B, the SM contexts (SM context 1 and SM context 2) and the MM contexts (MM context 1 and MM context 2) are decoupled at the wireless network (400). The AMFs (200AA, 200AB) connected to the central repository (200D) stores the MM contexts. The central repository (200D) stores the mapping of the SM contexts of each PDU session (PDU session 1 and PDU session 2), where the SMFs (200BA, 200BB) connected to the central repository (200D) stores the decoupled SM contexts. Whenever the AMFs (200AA, 200AB) needs the SM contexts to share to the UE (100), the AMFs (200AA, 200AB) fetches the SM contexts from the SMFs (200BA, 200BB) based on the mapping of the SM contexts of each PDU session (PDU session 1 and PDU session 2).

Figure 6A:
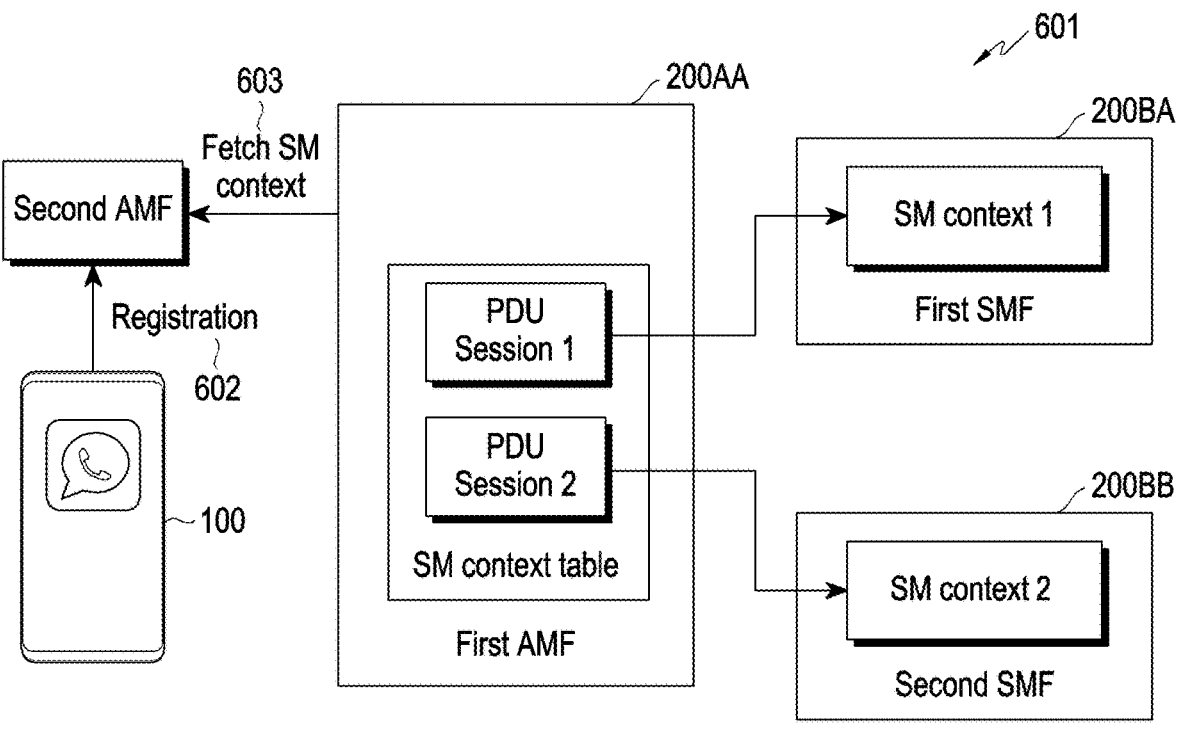
FIG. 6A illustrates an example scenario of maintaining the SM context by the AMF of the wireless network during a mobility/PLMN/RAT change, according to an embodiment as disclosed herein.
Figure 6A:
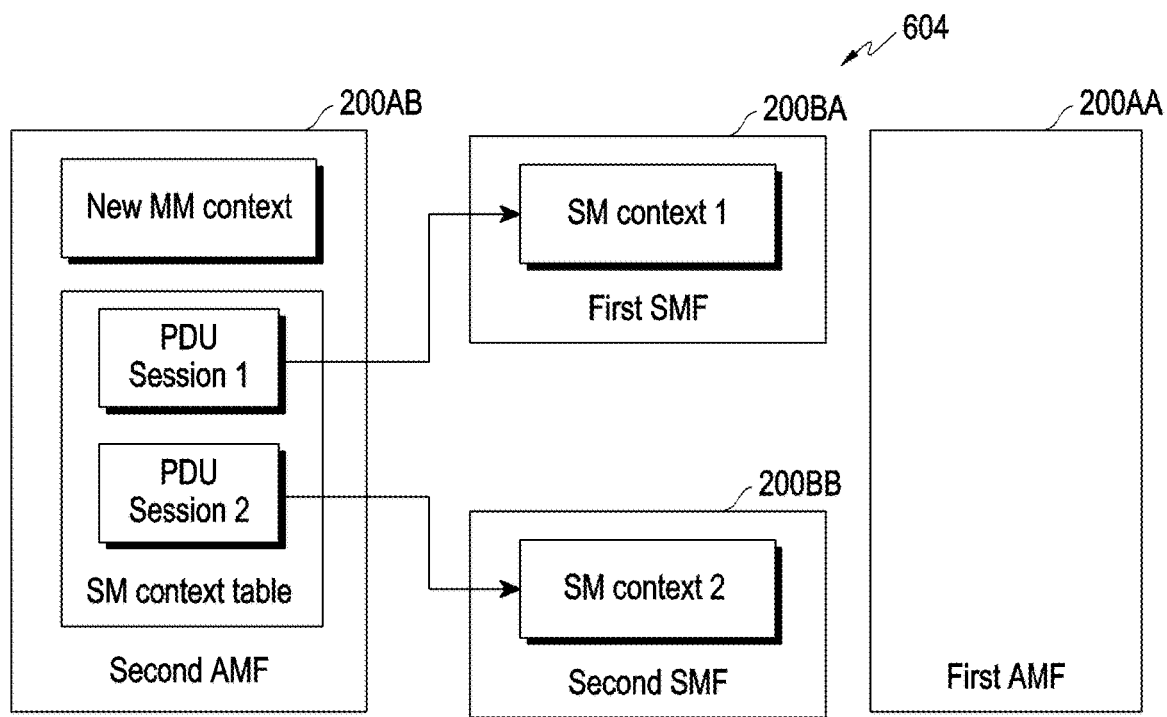

FIG. 6A illustrates an example scenario of maintaining the SM context by the AMF (200A) of the wireless network (400) during a mobility/PLMN/RAT change, according to an embodiment as disclosed herein. As shown in 601, the UE (100) does registration (602) with the new AMF (named as second AMF) (200AB) due to the mobility/PLMN/RAT change. The UE (100) is registered with the AMF (named as first AMF) (200AA) before the mobility/PLMN/RAT change, where the AMF (200AA) contains the SM context table that includes mapping of the PDU session with the SM contexts in the SMFs (200BA, 200BB). Upon registering the UE (100) to the new AMF (200AB), the new AMF (200AB) fetches (603) the SM context table and the mapping from the AMF (200AA). As shown in 604, upon providing the SM context table to the new AMF (200AB), the AMF (200AA) deletes the SM context table and the mapping from its storage area. The new AMF (200AB) creates a new MM context and provides the fetched SM context to the UE (100) via signaling or passing the fetched SM context to the UE (100) in data packets. Further, the UE (100) uses the received SM context and continues the modem/app service even though the MM context is created newly.

Figure 6B:
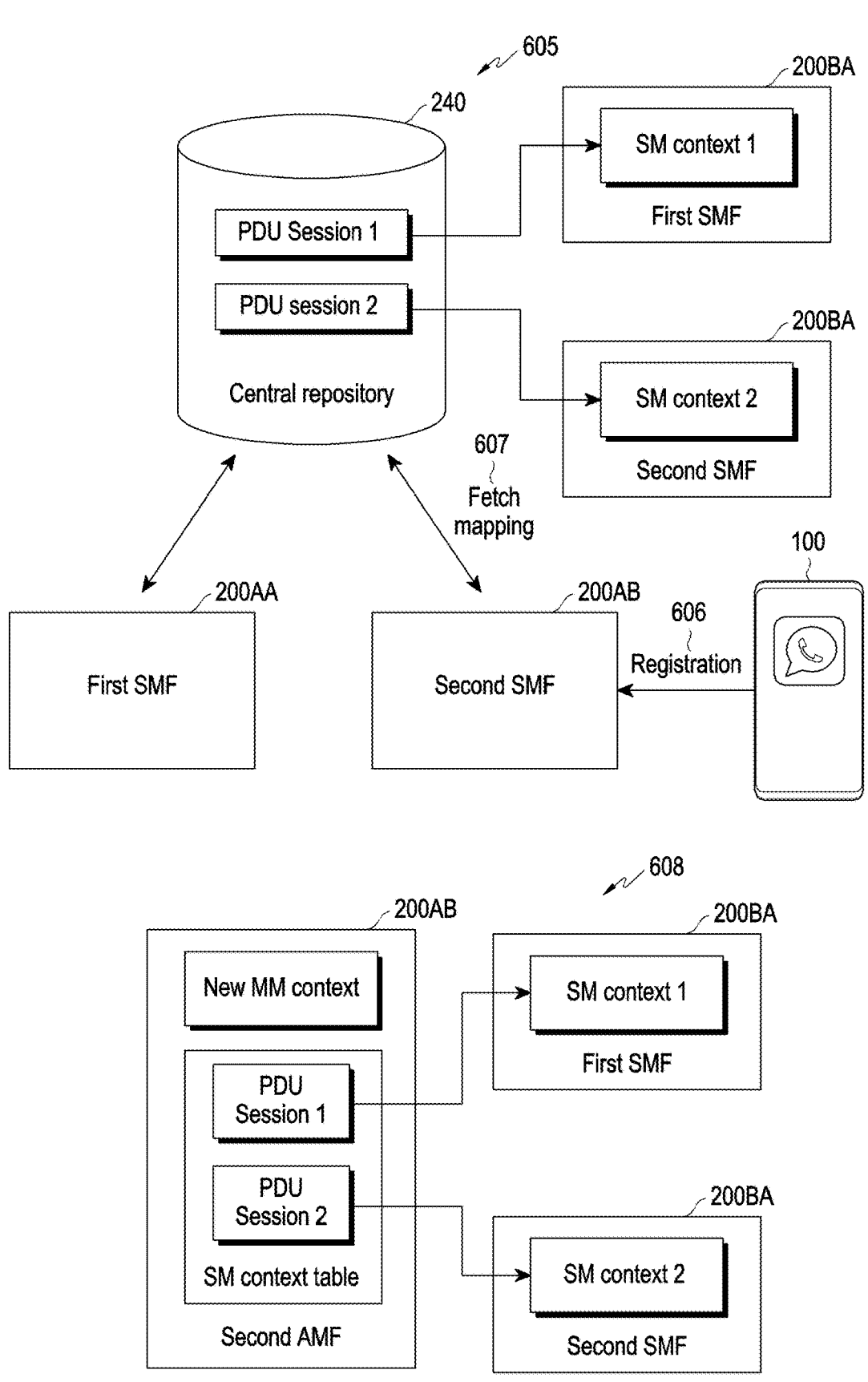
FIG. 6B illustrates an example scenario of maintaining the SM context by a central repository of the wireless network during the mobility/PLMN/RAT change, according to an embodiment as disclosed herein.

FIG. 6B illustrates an example scenario of maintaining the SM context by the central repository (200D) of the wireless network (400) during the mobility/PLMN/RAT change, according to an embodiment as disclosed herein. As shown in 605, the UE (100) does registration (606) with the new AMF (named as second AMF) (200AB) with the new MM context due to the mobility/PLMN/RAT change. The UE (100) is registered with the AMF (named as first AMF) (200AA) before the mobility/PLMN/RAT change, where the central repository (200D) contains the SM context table that includes mapping of the PDU session with the SM contexts in the SMFs (200BA, 200BB). Upon registering the UE (100) to the new AMF (200AB), the new AMF (200AB) fetches (607) the SM context table and the mapping from the central repository (200D). Further, the AMF (200AA) deletes the SM context and the mapping from its storage area. As shown in 608, the new AMF (200AB) creates the new MM context and provides the fetched SM context to the UE (100) via signaling or passing the fetched SM context to the UE (100) in the data packets. Further, the UE (100) uses the received SM context and continues the modem/app service even though the MM context is created newly.

Figure 7:
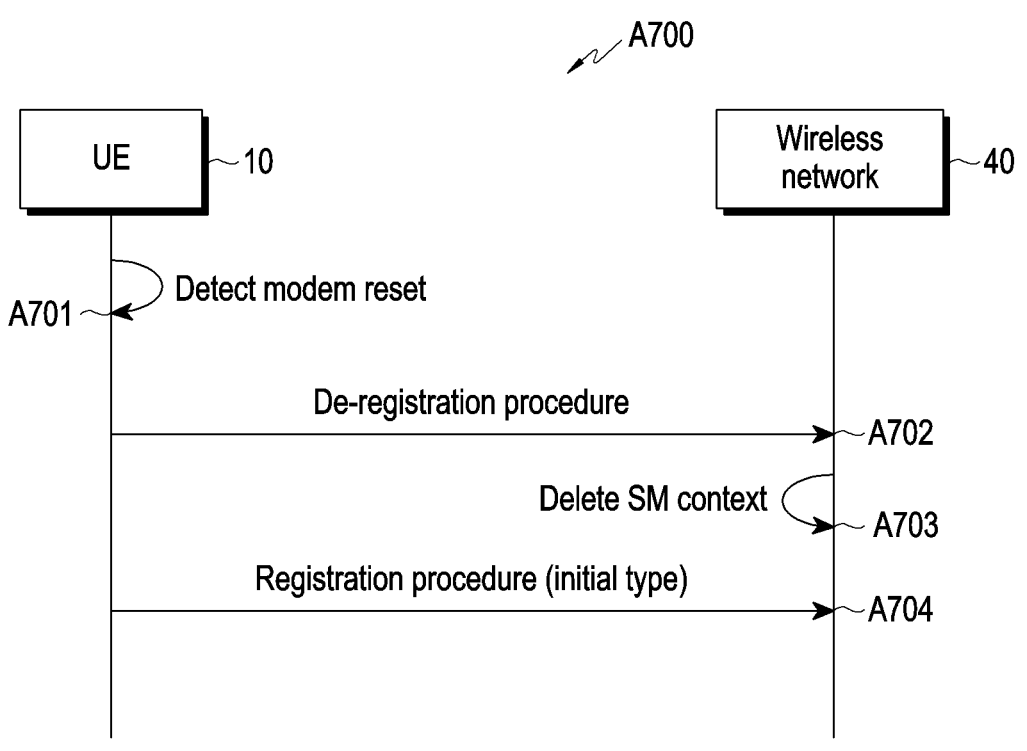
FIG. 7 illustrates a comparison of a conventional method and the proposed method for deregister and register due to a modem restart, according to an embodiment as disclosed herein.
Figure 7:
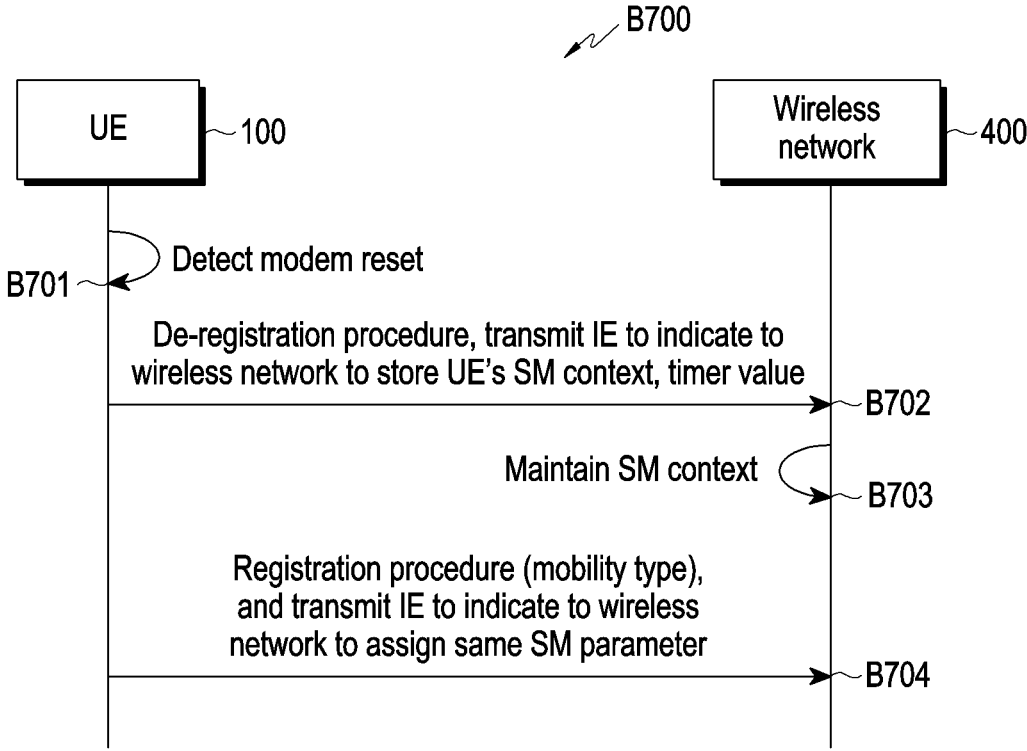

FIG. 7 illustrates a comparison of a conventional method and the proposed method for deregister and register due to the modem restart, according to an embodiment as disclosed herein. A 700 shows signaling between a conventional UE (10) and a conventional wireless network (40) for deregistering and registering due to the modem restart. When the modem reset occurs at A 701, then the UE (10) performs deregistration followed by re-registration. At 702, the UE (10) performs de-registration procedure or de-registered locally that causes SM context deletion at A 703. At 704, the UE (10) deactivates all PDU sessions, and releases all App connections socket, and performs registration procedure again with initial type.

B700 shows signaling between the proposed UE (100) and the proposed wireless network (400) for deregistering and registering due to the modem restart. When the modem reset occurs at B701, then the UE (100) performs de-registration followed by re-registration. The UE (100) decouples the SM & MM contexts, and stores the SM context till the expiry of the timer. At B702, the UE (100) indicates the wireless network (400) to retain the UE's SM context in the detach/de-registration message with addition of new IE. Additionally the detach/de-registration message includes the timer value of the timer, where the to store the SM context. At B703, the wireless network (400) stores SM context till the expiry of the timer.

In an embodiment, the UE (100) triggers the attach/ registration/TAU/NAS message using the stored SM context parameters includes the new IE to inform the wireless network (400) that the UE (100) is having the SM context. The attach/registration/TAU/NAS message indicates to the wireless network (400) for assigning same SM parameters used by the UE (100) previously. At B704, the UE (100) performs registration procedure with mobility type.

In another embodiment, the UE (100) triggers attach/registration/TAU/NAS message using the stored MM context parameters includes the new IE to inform the wireless network (400) that the UE (100) is having the MM context. The attach/registration/TAU/NAS message indicates to the wireless network (400) for assigning same SM parameters used by the UE (100) previously. The UE (100) performs registration procedure with mobility type.

Figure 8:
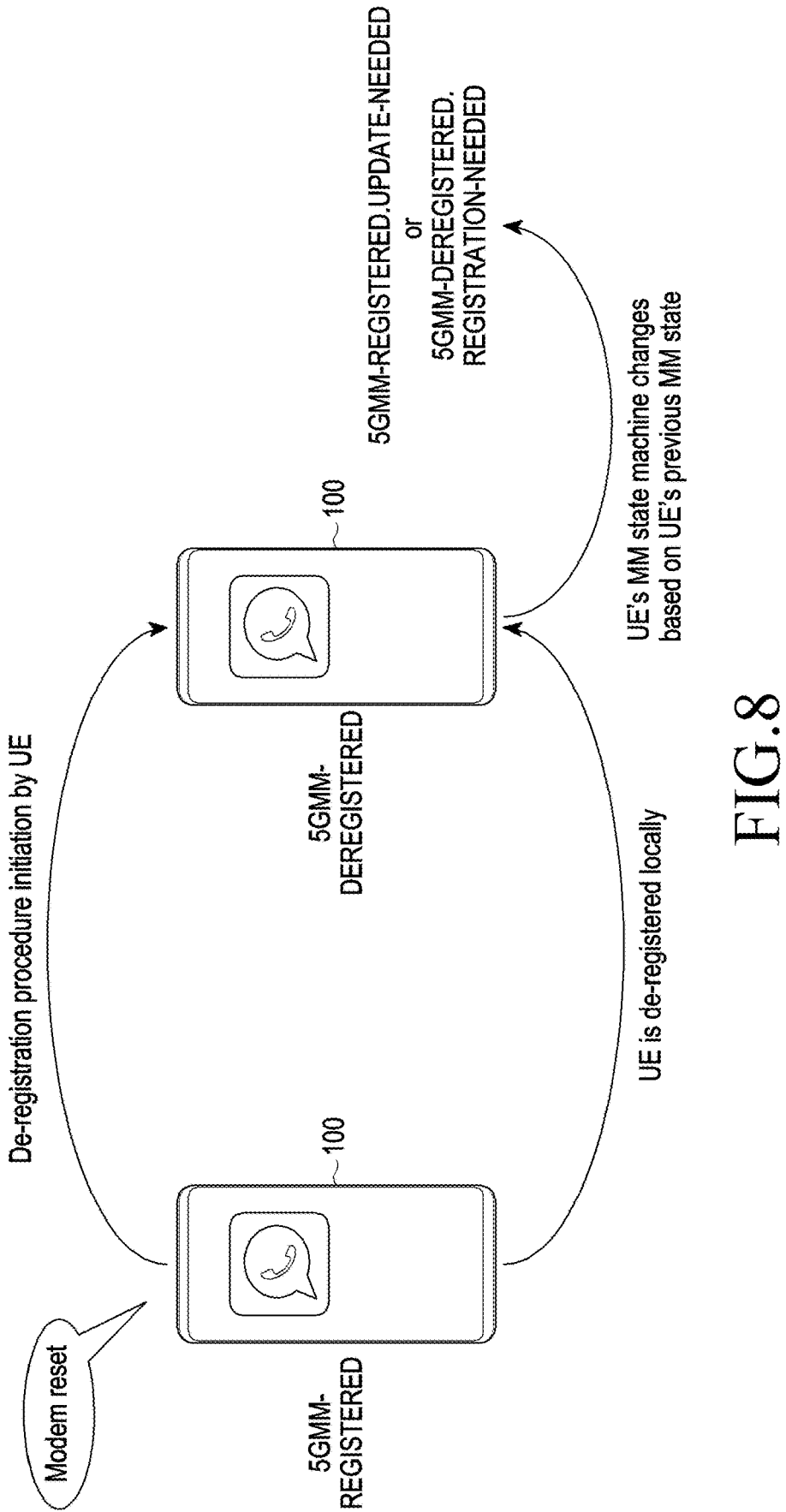
FIG. 8 illustrates MM state machine changes, according to an embodiment as disclosed herein.

FIG. 8 illustrates MM state machine changes, according to an embodiment as disclosed herein. When the modem reset occurs, the device reboots and the UE (100) performs de-registration followed by re-registration or de-registered locally, and initializes the MM state machine based on stored MM context. The UE (100) can have stored context in the SIM and MM state variable can be stored in the memory (120). The UE (100) moves from the 5GMM-DEREGISTERED state to the 5GMM-REGISTERED.UPDATE-NEEDED state or the EMM-DEREGISTERED state to the EMM-REGISTERED.UPDATE-NEEDED state based on the MM context stored parameters.

Figure 9:
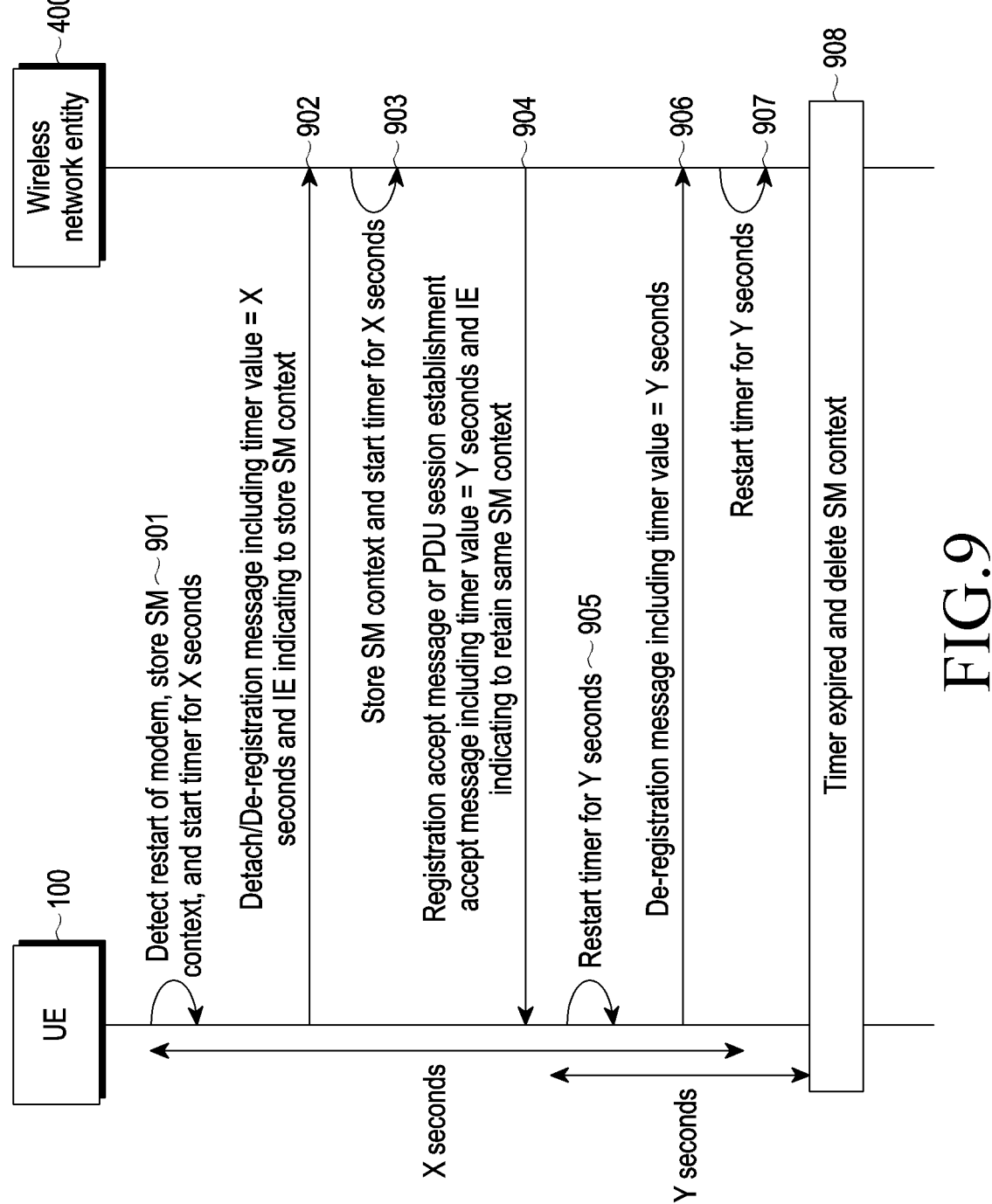
FIG. 9 is a sequential diagram illustrating a method of maintaining the SM context at the UE and the wireless network entity till an expiry of a timer, according to an embodiment as disclosed herein.

FIG. 9 is a sequential diagram illustrating a method of maintaining the SM context at the UE (100) and the wireless network entity (200) till the expiry of the timer, according to an embodiment as disclosed herein. The UE (100) includes the predefined timer for handling the stored SM context at the UE (100), and the wireless network (400) includes the predefined timer for handling the stored SM context at the SMF (200B). At 901, when the modem reset occurs, the UE (100) stores the SM context, and starts the timer of the UE (100) for X seconds. At 902, the UE (100) indicates to the wireless network entity (200) to retain the UE's SM context in the detach/de-registration message including the new IE along with the timer value of X seconds. At 903, the wireless network entity (200) starts the timer of the wireless network entity (200) for X seconds, and configured to store the SM context till expiry of the timer.

At 904, consider the wireless network entity (200) transmits the registration accept message or the PDU session establishment accept message including the timer value of Y seconds and the new IE indicating to retain same SM context to the UE (100) before reaching the expiry of the X seconds of the timer. Thus, the wireless network entity (200) can configure different timer values in the NAS signaling for handling the stored SM context at the UE (100) and the SMF (200B) based on network load/condition. At 905, upon receiving the registration accept message or PDU session establishment accept message, the UE (100) restart its timer to operate till Y seconds from a time of receiving the message. At 906, the UE (100) indicates to the wireless network entity (200) to retain the UE's SM context in another detach/de-registration message including the new IE along with the timer value of Y seconds. At 907, the wireless network entity (200) restarts its timer and sets to operate till the timer value of Y seconds, and configured to store the SM context till expiry of the timer. At 908, upon detecting the expiry of the timer and not receiving another registration accept message or PDU session establishment accept message including the new IE indicating to retain same SM context from the wireless network entity (200), both the UE (100) and the wireless network entity (200) terminates its timer after expiry of the timer, and deletes the stored SM context which further cause to lose the service continuity.

Alternately, if the UE (100) receives another registration accept message or PDU session establishment accept message including the new IE indicating to retain same SM context from the wireless network entity (200) before expiry of the timer, then both the UE (100) and the wireless network entity (200) terminates its timer, and the UE (100) uses the SM context for the service continuity.

Consider, the wireless network entity (200) transmits the registration accept message or the PDU session establishment accept message including the new IE indicating to retain same SM context to the UE (100) before the expiry of the X seconds of the timer. Then, both the UE (100) and the wireless network entity (200) terminates its timer, and the UE (100) uses the SM context for the service continuity. Consider, the wireless network entity (200) does not transmit the registration accept message or the PDU session establishment accept message including the new IE indicating to retain same SM context to the UE (100) before the expiry of the X seconds of the timer. Then, both the UE (100) and the wireless network entity (200) terminates the timer after expiry of the timer, and the UE (100) losses the service continuity.

FIG. 10 is a sequential diagram illustrating a method of obtaining the SM context by the UE (100) for the service continuity, according to an embodiment as disclosed herein. At 1001, the UE (100) triggers the registration and the attach using the stored MM context upon detecting the modem restart while consuming the modem service. At 1002, the UE (100) transmits the registration/attach message to the AMF (200A), where the registration/attach message including the IE indicating the MM context availability at the UE (100), and recovery request for the SM context. At 1003, the AMF (200A) instructs the SMF (200B) to not delete the SM context, and tries to fetch the SM context from the SMF (200B). At 1004, the AMF (200A) transmits the registration/attach accept message or a new NAS message, or the SM context in data packets for single/multiple PDN/DNNs and the registration/attach accept message to the UE (100). The registration/attach accept message includes the SM context if the AMF (200A) is transmitting only the registration/attach accept message. A container of the new NAS message includes the SM context.

FIG. 11 is a sequential diagram illustrating a method of obtaining the IP address, and the other parameters by the UE (100) for the service continuity, according to an embodiment as disclosed herein. At 1101, the UE (100) triggers the registration and the attach using the stored MM context upon detecting the modem restart while consuming the modem service. At 1102, the UE (100) transmits the registration/attach message to the AMF (200A), where the registration/attach message including the IE indicating the MM context availability at the UE (100), and the recovery request for the SM context. At 1103, the AMF (200A) instructs the SMF (200B) to not delete the SM context, and tries to fetch the SM context from the SMF (200B). At 1104, the AMF (200A) transmits the registration/attach accept message includes the SM context availability, and the PDN list to the UE (100). At 1105, the UE (100) transmits the request for PDU session establishment by providing the exiting PDU and the SM context recovery request. At 1106, the AMF (200A) fetches the SM context from the SMF (200B). At 1107, the AMF (200A) activates the PDU session with the UE (100) by providing same IP address initially used by the UE (100) for consuming the modem service, and other parameters to the UE (100). At 1108, the UE (100) follows same steps for other PDN/DNN and recover SM parameters based on the received IP address and other parameters.

FIG. 12 is a sequential diagram illustrating a method of obtaining the APN, the PDU session ID, the IP address, and the other parameters by the UE (100) for the service continuity, according to an embodiment as disclosed herein. At 1201, the UE (100) triggers the registration and the attach using the stored MM context upon detecting the modem restart while consuming the modem service. At 1202, the UE (100) transmits the registration/attach message to the AMF (200A), where the registration/attach message including the IE indicating the MM context availability at the UE (100), and the recovery request for the SM context. At 1203, the AMF (200A) instructs the SMF (200B) to not delete the SM context, and tries to fetch the SM context from the SMF (200B). At 1204, the AMF (200A) transmits the registration/attach accept message includes the SM context availability, and the PDN list to the UE (100). At 1205, the AMF (200A) fetches the SM context from the SMF (200B). At 1206, the AMF (200A) activates the PDU session with the UE (100) by providing the APN, the PDU session ID, the IP address, and the other parameters to the UE (100). At 1207, the AMF (200A) follows same steps for other PDN/DNN and share SM parameters based on the IP address and other parameters.

FIG. 13 is a sequential diagram illustrating a method of obtaining the PDU context by the UE (100) for the service continuity, according to an embodiment as disclosed herein. At 1301, the UE (100) triggers the registration and the attach using the stored MM context upon detecting the modem restart while consuming the modem service. At 1302, the UE (100) transmits the registration/attach message to the AMF (200A), where the registration/attach message including the IE indicating the MM context availability at the UE (100), and the recovery request for the SM context. At 1303, the AMF (200A) instructs the SMF (200B) to not delete the SM context, and tries to fetch the SM context from the SMF (200B). At 1304, the AMF (200A) transmits the registration/attach accept message includes the SM context availability, and the PDN list to the UE (100). At 1305, the AMF (200A) and the UE (100) setups with the default bearer. At 1306, the AMF (200A) fetches the SM context from the SMF (200B). At 1307, the AMF (200A) transmits the PDU context (e.g. PDU ID 1 Context, PDU ID 2 Context, PDU ID 3 Context) shared over the default bearer in data packets to the UE (100). At 1308, the UE (100) parses the PDU context for PDU parameters and activation.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method for continuity a modem service by a user equipment (UE), the method comprising:

detecting a restart of a modem of the UE while accessing a wireless network using the modem service;

determining whether a wireless network entity supports a session and mobility management feature upon detecting the restart of the modem;

identifying, session management (SM) context and mobility management (MM) context used by the UE for accessing the modem service upon determining that the wireless network entity supports the session and the mobility management feature; and transmitting a first signaling message comprising at least one of the SM context or the MM context to the wireless network entity.

2. The method of claim 1, wherein determining whether the wireless network entity supports the session and the mobility management feature comprises:

receiving a third signaling message comprising information of availability of the session and the mobility management feature at the wireless network entity, a list of public land mobile networks (PLMNs) comprising the SM context, and a protocol data unit (PDU) or a data network (DNN) corresponding to the session and the mobility management feature from the wireless network entity; and determining whether the wireless network entity supports the session and the mobility management feature based on the third signaling message.

3. The method of claim 1, wherein transmitting the first signaling message comprising at least one of the SM context or the MM context to the wireless network entity comprises:

determining whether the at least one of the SM context or the MM context is available at a first storage area;

parsing at least one of the SM context or the MM context using a new protocol upon determining that at least one of the SM context or the MM context is stored at the UE;

initiating a timer;

transmitting the first signaling message comprising a timer value and the at least one of the parsed SM context or the parsed MM context to the wireless network entity based on availability of the SM context and the MM context at the first storage area;

performing one of:

receiving a second signaling message comprising the at least one of the SM context or the MM context from the wireless network entity before expiry of the timer, terminating the timer, and continue accessing the wireless network using the modem service based on the second signaling message, or not receiving the second signaling message comprising the at least one of the SM context or the MM context from the wireless network entity before expiry of the timer, terminating the timer, and transmitting another signaling message for new SM contexts and new MM contexts; and deleting at least one the SM context and the MM context from the first storage area in response to the expiry or the termination of the timer, when the at least one of the SM context or the MM context is available at the first storage area.

4. The method of claim 3, wherein receiving the second signaling message comprising the SM context from the wireless network entity comprises:

receiving a fourth signaling message comprising the availability of the SM context at the wireless network entity and a packet data network (PDN) list from the wireless network entity;

transmitting a fifth signaling message comprising an existing PDU and a context recovery information element to the wireless network entity upon receiving the fourth signaling message from the wireless network entity; and receiving the second signaling message comprising at least one of an internet protocol (IP), other parameters, access point name (APN), a PDU session identifier (ID), the IP and the other parameters used for accessing the wireless network, or a PDU context shared over a default bearer from the wireless network entity upon transmitting the fifth signaling message to the wireless network entity.

5. The method of claim 1, wherein identifying the SM context and the MM context used by the UE for accessing the modem comprises:

determining the SM context, the MM context, and a connection socket context of an application used for accessing the wireless network using the modem service;

decoupling the SM context and the MM context;

storing the connection socket context and at least one of the SM context or the MM context to a first storage area; and moving from one of a SGMM-DEREGISTERED state to 5GMM-REGISTERED.UPDATE-NEEDED state, or an EMM-DEREGISTERED state to EMM-REGISTERED.UPDATE-NEEDED state based on the stored MM context.

6. A method for a modem service by a wireless network entity, the method comprising:

receiving a first signaling message comprising at least one of session management (SM) context or mobility management (MM) context from a user equipment (UE) upon restarting a modem of the UE while accessing a wireless network using the modem service;

determining a connection socket context of an application used for accessing the wireless network upon receiving the first signaling message from the UE;

storing the connection socket context and at least one of the SM context or the MM context to a second storage area;

determining whether the UE supports a session and mobility management feature upon storing the connection socket context and the at least one of the SM context or the MM context to the second storage area; and transmitting a second signaling message comprising at least one of the SM context or the MM context to the UE upon determining that the UE supports the session and the mobility management feature.

7. The method of claim 6, wherein determining; whether the UE supports the session and the mobility management feature comprises:

receiving a third signaling message comprising information of availability of the session and the mobility management feature at the UE, and a protocol data unit (PDU) or a data network (DNN) corresponding to the session and the mobility management feature from the UE; and determining whether the UE supports the session and mobility management feature based on the third signaling message.

8. The method of claim 6, wherein transmitting the second signaling message to the UE, comprises:

determining a timer value from the first signaling message;

initiating a timer based on the timer value, wherein the timer value is modified and the modified timer value at the UE is configured;

parsing at least one of the stored SM context or the stored MM context using a new protocol;

determining whether at least one of the stored SM context or the stored MM context is parsed before expiry of the timer; and performing one of:

transmitting the second signaling message comprising the at least one of the parsed SM context or the parsed MM context before expiry of the timer upon determining that at least one of the stored SM context or the stored MM context is parsed before expiry of the timer, and terminating the timer, or transmitting the second signaling message without comprising at least one of the stored SM context or the stored MM context upon determining that at least one of the stored SM context or the stored MM context is not parsed before expiry of the timer, and terminating the timer, and deleting the at least one the SM context and the MM context from the second storage area in response to the expiry or termination of the timer, when the at least one of the SM context or the MM context is available at the second storage area.

9. The method of claim 8, wherein transmitting the second signaling message comprising the at least one of the SM context or the MM context, comprises:

transmitting a fourth signaling message comprising availability of the SM context at the wireless network entity and a packet data network (PDN) list to the UE;

receiving a fifth signaling message comprising an existing PDU and a context recovery information element from the UE; and transmitting the second signaling message comprising at least one of an internet protocol (IP), other parameters, an access point name (APN), or a PDU session identifier (ID) used by the UE for accessing the wireless network to the UE.

10. The method of claim 8, wherein receiving the second signaling message comprising the SM context from the wireless network entity; comprises:

transmitting the fourth signaling message comprising availability of the SM context at the wireless network entity and a PDN list to the UE; and transmitting the second signaling message comprising a PDU context shared over a default bearer to the UE.

11. The method of claim 6, wherein the second storage area is located at one of an access and mobility management function (AMF), a session management function (SMF), or a central repository, and wherein when the SM context is stored at the central repository, then the AMF fetches the SM context from the central repository for providing the SM context to the UE.

12. A user equipment (UE) for a modem service, the UE comprising:

a memory;

a modem; and a processor coupled to the memory and the modem, wherein the processor is configured to:

detect a restart of the modem of the UE while accessing a wireless network using the modem service, determine whether a wireless network entity supports a session and mobility management feature upon detecting the restart of the modem, identify session management (SM) context and mobility management (MM) context used by the UE for accessing the modem service upon determining that the wireless network entity supports the session and the mobility management feature, and transmit a first signaling message comprising at least one of the SM context or the MM context to the wireless network entity.

13. The UE of claim 12, wherein to determine whether the wireless network entity supports the session and the mobility management feature the processor is further configured to:

receive a third signaling message comprising information of availability of the session and the mobility management feature at the wireless network entity, a list of public land mobile networks (PLMNs) comprising the SM context, and a protocol data unit (PDU) or a data network (DNN) corresponding to the session and the mobility management feature from the wireless network entity, and determine whether the wireless network entity supports the session and the mobility management feature based on the third signaling message.

14. The UE of claim 12, wherein to transmit the first signaling message comprising the at least one of the SM context or the MM context to the wireless network entity, the processor is further configured to:

determine whether the at least one of the SM context or the MM context is available at a first storage area, parse at least one of the SM context or the MM context using a new protocol upon determining that at least one of the SM context or the MM context is stored at the UE, initiate a timer, transmit the first signaling message comprising a timer value and the at least one of the parsed SM context or the parsed MM context to the wireless network entity based on availability of the SM context and the MM context at the first storage area, perform one of:

receive a second signaling message comprising the at least one of the SM context or the MM context from the wireless network entity before expiry of the timer, terminate the timer, and continue accessing the wireless network using the modem service based on the second signaling message, and not receive the second signaling message comprising the at least one of the SM context or the MM context from the wireless network entity before expiry of the timer, terminate the timer, and transmit another signaling message for new SM contexts and new MM contexts, and delete at least one the SM context or the MM context from the first storage area in response to the expiry or the termination of the timer, when the at least one of the SM context or the MM context is available at the first storage area.

15. The UE of claim 14, wherein to receive the second signaling message comprising the SM context from the wireless network entity, the processor is further configured to:

receive a fourth signaling message comprising the availability of the SM context at the wireless network entity and a packet data network (PDN) list from the wireless network entity, transmit a fifth signaling message comprising an existing PDU and a context recovery information element to the wireless network entity upon receiving the fourth signaling message from the wireless network entity, and receive the second signaling message comprising at least one of an internet protocol (IP), other parameters, access point name (APN), a PDU session identifier (ID), the IP and the other parameters used for accessing the wireless network, or a PDU context shared over a default bearer from the wireless network entity upon transmitting the fifth signaling message to the wireless network entity.

16. The UE of claim 12, wherein to identify the SM context and the MM context used by the UE for accessing the modem, the processor is further configured to:

determine the SM context, the MM context, and a connection socket context of an application used for accessing the wireless network using the modem service, decouple the SM context and the MM context, store the connection socket context and at least one of the SM context or the MM context to a first storage area, and move from one of a 5GMM-DEREGISTERED state to 5GMM-REGISTERED UPDATE-NEEDED state, or an EMM-DEREGISTERED state to EMM-REGISTERED.UPDATE-NEEDED state based on the stored MM context.

17. A wireless network entity for a modem service, the wireless network entity comprising:

a memory;

a processor coupled to the memory, wherein the processor is configured to:

receive a first signaling message comprising at least one of session management (SM) context or mobility management (MM) context from a user equipment (UE) upon restarting a modem of the UE while accessing a wireless network using the modem service, determine a connection socket context of an application used for accessing the wireless network entity using the modem service upon receiving the first signaling message from the UE, store the connection socket context and at least one of the SM context or the MM context to a second storage area, determine whether the UE supports a session and mobility management feature upon storing the connection socket context and the at least one of the SM context or the MM context to the second storage area, and transmit a second signaling message comprising at least one of the SM context or the MM context to the UE upon determining that the UE supports the session and the mobility management feature.

18. The wireless network entity of claim 17, wherein to determine whether the UE supports the session and the mobility management feature, the processor is further configured to:

receive a third signaling message comprising information of availability of the session and the mobility management feature at the UE, and a protocol data unit (PDU) or a data network (DNN) corresponding to the session and the mobility management feature from the UE, and determine whether the UE supports the session and mobility management feature based on the third signaling message.

19. The wireless network entity of claim 17, wherein for transmitting the second signaling message to the UE, the processor is configured to:

determine a timer value from the first signaling message;

initiate a timer based on the timer value, wherein the timer value is modified and the modified timer value at the UE is configured;

parse at least one of the stored SM context or the stored MM context using a new protocol;

determine whether at least one of the stored SM context or the stored MM context is parsed before expiry of the timer; and perform one of:

transmitting the second signaling message comprising the at least one of the parsed SM context or the parsed MM context before expiry of the timer upon determining that at least one of the stored SM context or the stored MM context is parsed before expiry of the timer, and terminating the timer, or transmitting the second signaling message without comprising at least one of the stored SM context or the stored MM context upon determining that at least one of the stored SM context or the stored MM context is not parsed before expiry of the timer, and terminating the timer, and delete the at least one of the SM context or the MM context from the second storage area in response to the expiry or termination of the timer, when the at least one of the SM context or the MM context is available at the second storage area.

20. The wireless network entity of claim 17, wherein the second storage area is located at one of an access and mobility management function (AMF), a session management function (SMF), or a central repository, and wherein when the SM context is stored at the central repository, then the AMF fetches the SM context from the central repository for providing the SM context to the UE.

\* \* \* \* \*